US00RE47327E

(19) United States
(12) Reissued Patent
Lee

(10) Patent Number: US RE47,327 E
(45) Date of Reissued Patent: Mar. 26, 2019

(54) IMAGE DISPLAY APPARATUS AND METHOD FOR OPERATING THE SAME

(71) Applicant: LG ELECTRONICS INC, Seoul (KR)

(72) Inventor: Sangseok Lee, Seoul (KR)

(73) Assignee: LG ELECTRONICS INC., Seoul (KR)

(21) Appl. No.: 14/830,850

(22) Filed: Aug. 20, 2015

Related U.S. Patent Documents

Reissue of:

(64) Patent No.: 8,522,279
Issued: Aug. 27, 2013
Appl. No.: 13/044,310
Filed: Mar. 9, 2011

U.S. Applications:

(60) Provisional application No. 61/413,701, filed on Nov. 15, 2010.

(30) Foreign Application Priority Data

Nov. 15, 2010 (KR) ..... 10-2010-0113364

(51) Int. Cl.
*H04N 21/258* (2011.01)
*H04N 21/475* (2011.01)
*H04N 21/482* (2011.01)

(52) U.S. Cl.
CPC ... *H04N 21/25875* (2013.01); *H04N 21/4751* (2013.01); *H04N 21/482* (2013.01)

(58) Field of Classification Search
CPC ..... H04N 21/25875; H04N 21/482; H04N 21/4751
(Continued)

(56) References Cited

U.S. PATENT DOCUMENTS 5,978,043 A * 11/1999 Blonstein ..... H04N 5/50 348/564
6,177,931 B1 1/2001 Alexander et al.
(Continued)

FOREIGN PATENT DOCUMENTS

KR 10-2007-0024808 3/2007
KR 10-2009-0105280 10/2009
(Continued)

OTHER PUBLICATIONS

European Search Report dated Oct. 8, 2015 issued in Application No. 15001244.1.
(Continued)

*Primary Examiner* — Mark Sager
(74) *Attorney, Agent, or Firm* — KED & Associates, LLP

(57) ABSTRACT

An image display device and a method for operating the same is disclosed. The method of controlling the display device may include displaying a video on the display received through a channel of a broadcast signal tuned by a tuner or over a network. The first and second multifunctional menu screens may be configured to include at least one of a first card object configured to display a scaled image of the video, a second card object that includes at least one link to tune to one or more channels of the broadcast signal or the network, or a third card object that includes at least one link for connecting to a content provider or to a storage device, wherein the first multifunctional menu screen is configured to be different than the second multifunctional menu screen. The configured first or second multifunctional menu screen may be displayed in response to a login request to a
(Continued)

corresponding user account, wherein the first multifunctional menu screen may be associated with a first user account and the second multifunctional menu screen may be associated with a second user account.

16 Claims, 44 Drawing Sheets

(58) Field of Classification Search
USPC ..... 725/30, 44, 46, 47
See application file for complete search history.

(56) References Cited

U.S. PATENT DOCUMENTS

| | | | | |
|---|---|---|---|---|
| 7,489,299 | B2 * | 2/2009 | Liberty | G06F 3/017 345/158 |
| 7,703,116 | B1 * | 4/2010 | Moreau | G06F 3/0482 725/44 |
| 8,239,497 | B2 * | 8/2012 | Kazerouni et al. | 709/219 |
| 2003/0182658 | A1 | 9/2003 | Alexander | |
| 2008/0092173 | A1 | 4/2008 | Shannon et al. | |
| 2009/0138922 | A1 * | 5/2009 | Thomas et al. | 725/87 |

FOREIGN PATENT DOCUMENTS

| | | |
|---|---|---|
| KR | 10-2009-0110202 | 10/2009 |
| KR | 10-2010-0064099 | 6/2010 |
| WO | WO 2007/146529 A2 | 12/2007 |

OTHER PUBLICATIONS

Netherland Office Action issued in related Application No. NL2006394 dated Mar. 15, 2012.
U.S. Office Action issued in related U.S. Appl. No. 13/044,310 dated Nov. 14, 2012.
U.S. Notice of Allowance issued in related U.S. Appl. No. 13/044,310 dated Apr. 24, 2013.
Hewlett-Packard Company: "HP Media Center PC User's Guide"; User Guide Hewlett Packard; XX, XX; Jan. 1, 2003; pp. 1-232; XP002378322.
European Office Action dated May 26, 2017 issued in Application No. 15001244.1.

* cited by examiner

IMAGE DISPLAY APPARATUS AND METHOD FOR OPERATING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application *is a Reissue of U.S. Pat. No. 8,522,279, filed on Mar. 9, 2011 and issued on Aug. 27, 2013 which* claims the benefit of Korean Patent Application No. 10-2010-0113364, filed on Nov. 15, 2010 in the Korean Intellectual Property Office, and the benefit of and priority to U.S. Provisional Application No. 61/413,701 filed on Nov. 15, 2010 in the United States Patent and Trademark Office, the disclosure of which are hereby incorporated by reference in their entirety.

BACKGROUND

1. Field

An image display apparatus and a method for operating the same is disclosed herein.

2. Background

Image display apparatuses and method for operating the same are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Figure 1:
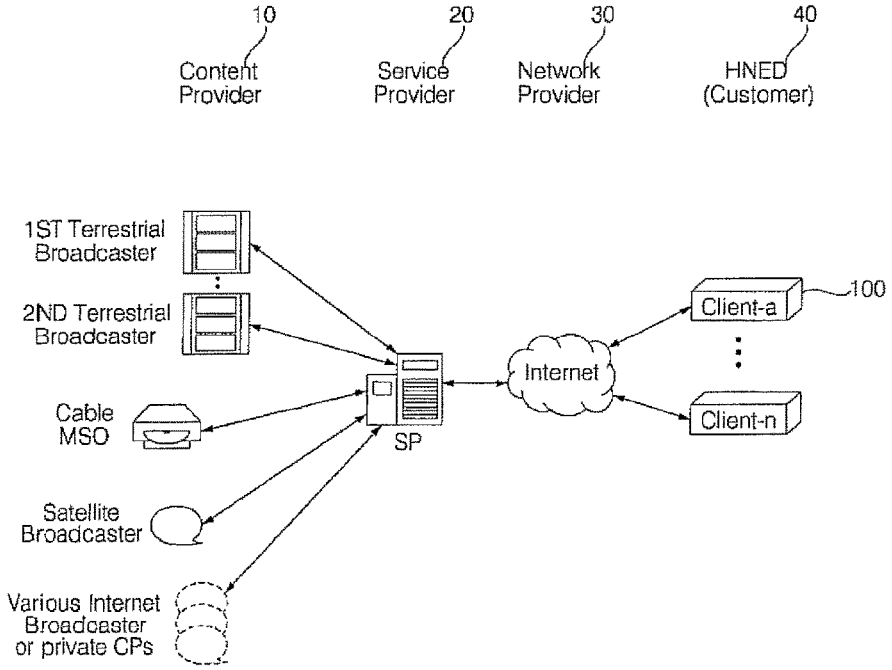
FIG. 1 is a diagram of a configuration of a broadcasting system that includes an image display apparatus according to an embodiment of the present disclosure.

The present invention relates to an image display apparatus and a method for operating the same, and more particularly, to an image display apparatus and a method for operating the same, which may increase user convenience.

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

Therefore, the present invention has been made in view of the above problems, and it is an object of the present invention to provide an image display apparatus and a method for operating the same, which can increase user convenience.

It is another object of the present invention to provide an image display apparatus and a method for operating the same, which can easily acquire desired information, set a screen configuration on a user account basis, and provide various user interfaces.

In accordance with an aspect of the present invention, the above and other objects can be accomplished by the provision of a method for operating an image display apparatus, including acquiring user account authentication information, performing a login operation using a user account corresponding to the acquired authentication information, receiving an account-based environmental setting input for screen configuration information of the user account, and storing the account-based environmental setting input in a memory in a state of being divided according to user accounts.

In accordance with another aspect of the present invention, there is provided a method for operating an image display apparatus, including displaying a screen, acquiring user account authentication information, performing a login operation using a user account based on the acquired user account authentication information, entering an edit mode of the screen, receiving an input for changing a screen configuration, and storing the input for changing the screen configuration in a memory.

In accordance with a further aspect of the present invention, there is provided a method for operating an image display apparatus, including displaying a screen, acquiring user account authentication information, performing a login operation using a user account based on the acquired user account authentication information, and switching the screen to a screen corresponding to environmental setting of the user account and displaying the switched screen.

According to the embodiment of the present invention, it is possible to set various screen configurations on a user account basis. Accordingly, it is possible to set a screen configuration according to user preference and to readily obtain a variety of information. Thus, user convenience is increased.

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function, for example. Thus the image display apparatus may have user-friendly interfaces such as a handwriting input device, a touch screen, or a pointing device. Further, because the image display apparatus supports wired or wireless Internet, it is capable of e-mail transmission/reception, Web browsing, banking, gaming, etc. by connecting to the Internet or a computer. To implement these functions, the image display apparatus may operate based on a standard general-purpose Operating System (OS).

Various applications can be freely added to or deleted from, for example, a general-purpose OS kernel in the image display apparatus according to the present invention. Therefore, the image display apparatus may perform a number of user-friendly functions. The image display apparatus may be a network TV, a Hybrid broadcast broadband TV (HbbTV), a smart TV, etc. for example. The image display apparatus is applicable to a smart phone, as needed.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected by the applicant at his or her discretion. Furthermore, the present invention must be understood, not simply by the actual terms used but by the meanings of each term lying within.

FIG. 1 is a diagram of a configuration of a broadcasting system that includes an image display apparatus according to an embodiment of the present disclosure. Referring to FIG. 1, the broadcasting system may include a Content Provider (CP) 10, a Service Provider (SP) 20, a Network Provider (NP) 30, and a Home Network End Device (HNED) 40. The HNED 40 corresponds to, for example, a client 100 which is an image display apparatus according to an embodiment. The image display apparatus may be a network TV, a smart TV, an Internet Protocol TV (IPTV), etc.

The CP 10 may create and provide content. The CP 10 may be, for example, a terrestrial broadcaster, a cable System Operator (SO) or Multiple System Operator (MSO), a satellite broadcaster, an Internet broadcaster, as illustrated in FIG. 1, or another appropriate content provider. Besides broadcast content, the CP 10 may also provide various applications.

The SP 20 may provide content received from the CP 10 in a service package. For instance, the SP 20 may package a first terrestrial broadcasting, second terrestrial broadcasting, cable broadcasting, satellite broadcasting, Internet broadcasting, and/or applications and may provide the package to users. The SP 20 may unicast or multicast a service to the client 100. Unicast is a form of transmission in which information is sent from only one transmitter to only one receiver. In other words, unicast transmission is point-to-point, involving two nodes only. In an example of unicast transmission, upon receipt of a request for data from a receiver, a server may transmit the data to a single receiver.

Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service may be provided to the client 100. The client 100 may construct a home network and receive a service over the home network.

Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
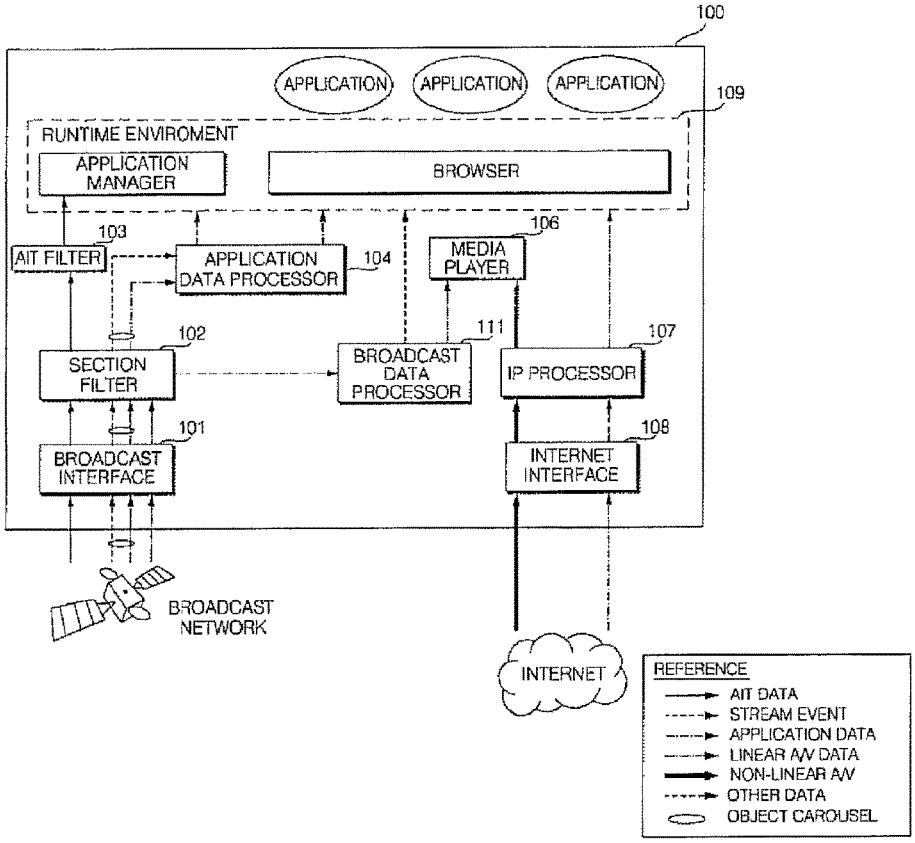
FIG. 2 shows a broadcasting system including an image display apparatus according to another embodiment of the present disclosure.

FIG. 2 shows a broadcasting system including an image display apparatus according to another embodiment of the present disclosure. Referring to FIG. 2, the image display apparatus 100 may be connected to a broadcast network and the Internet. The image display apparatus 100 may be, for example, a network TV, a smart TV, an HbbTV, or another appropriate multifunctional display device. The image display apparatus 100 may include, for example, a broadcast interface 101, a section filter 102, an Application Information Table (AIT) filter 103, an application data processor 104, a broadcast data processor 111, a media player 106, an IP processor 107, an Internet interface 108, and a runtime module 109. The image display apparatus 100 may receive AIT data, real-time broadcast content, application data, and stream events through the broadcast interface 101. The real-time broadcast content may be referred to as a linear Audio/Video (A/V) content.

The section filter 102 may perform section filtering on the four types of data received through the broadcast interface 101. The section filter 102 may output the AIT data to the AIT filter 103, the linear A/V content to the broadcast data processor 111, and the stream events and application data to the application data processor 104.

Meanwhile, the image display apparatus 100 may receive non-linear A/V content and application data through the Internet interface 108. The non-linear A/V content may be, for example, a Content On Demand (CoD) application. The non-linear A/V content and the application data may be transmitted to the media player 106 and the runtime module 109, respectively. The runtime module 109 may include, for example, an application manager and a browser as illustrated in FIG. 2. The application manager controls the life cycle of an interactive application using the AIT data, for example. The browser displays and processes the interactive application.

Figure 3:
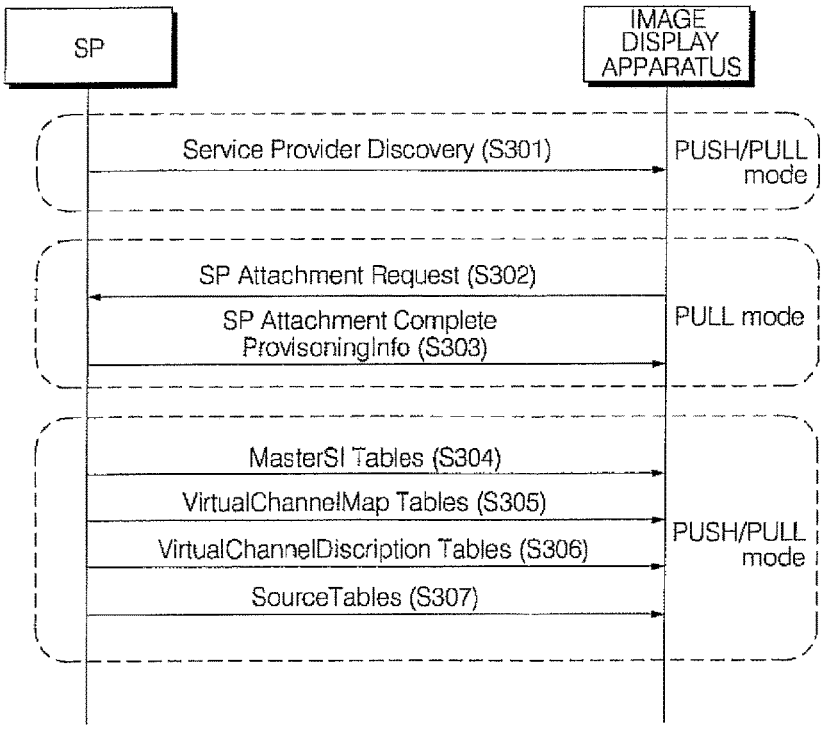
FIG. 3 is a diagram illustrating a signal flow between a Service Provider (SP) and an image display apparatus of FIG. 1 or 2, according to an embodiment of the present disclosure.

FIG. 3 illustrates an operation for connecting to an SP and receiving channel information from the SP in the image display apparatus of FIG. 1 or 2. Referring to FIG. 3, an SP may perform an SP Discovery operation (S301) and the image display apparatus may transmit a Service Provider Attachment Request signal to the SP (S302). Upon completion of attachment to the SP, the image display apparatus may receive provisioning information from the SP (S303). Further, the image display apparatus may receive Master System Information (SI) Tables, Virtual Channel Map Tables, Virtual Channel Description Tables, and Source Tables from the SP (S304 to S307). More specifically, SP Discovery is a process by which SPs that provide IPTV services may search for Service Discovery (SD) servers having information about the offerings of the SPs.

In order to receive information about the SD servers, an SD server address list can be detected, for example, using three methods. Specifically, the SD server address list may be obtained by an address preset in the image display apparatus or an address manually set by a user, Dynamic Host Configuration Protocol (DHCP)-based SP Discovery, and Domain Name System Service (DNS SRV)-based SP Discovery. The image display apparatus accesses a specific SD server using the SD server address list obtained through one of the above three methods and receives a SP Discovery record from the specific SD server. The Service Provider Discovery record may include information needed to perform Service Discovery on an SP basis. The image display apparatus may then start a Service Discovery operation using the SP Discovery record. These operations can be performed in a push mode or a pull mode.

The image display apparatus may access an SP attachment server specified by an SP attachment locator included in the SP Discovery record and performs a registration procedure (or a service attachment procedure). Further, after accessing an authentication service server of an SP specified by an SP authentication locator and performing an authentication procedure, the image display apparatus may perform a service authentication procedure. After service attachment is successfully performed, a server may transmit data in the form of a provision information table to the image display apparatus.

During service attachment, the image display apparatus may include an Identifier (ID) and location information thereof in data, and transmit the data to the service attachment server. Thus, the service attachment server may specify a service that the image display apparatus has subscribed to based on the ID and location information. In addition, the service attachment server may provide, in the form of a provisioning information table, address information from which the image display apparatus can obtain Service Information (SI). The address information may correspond to access information about a Master SI Table. This method facilitates provisioning of a customized service to each subscriber.

The SI may be divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
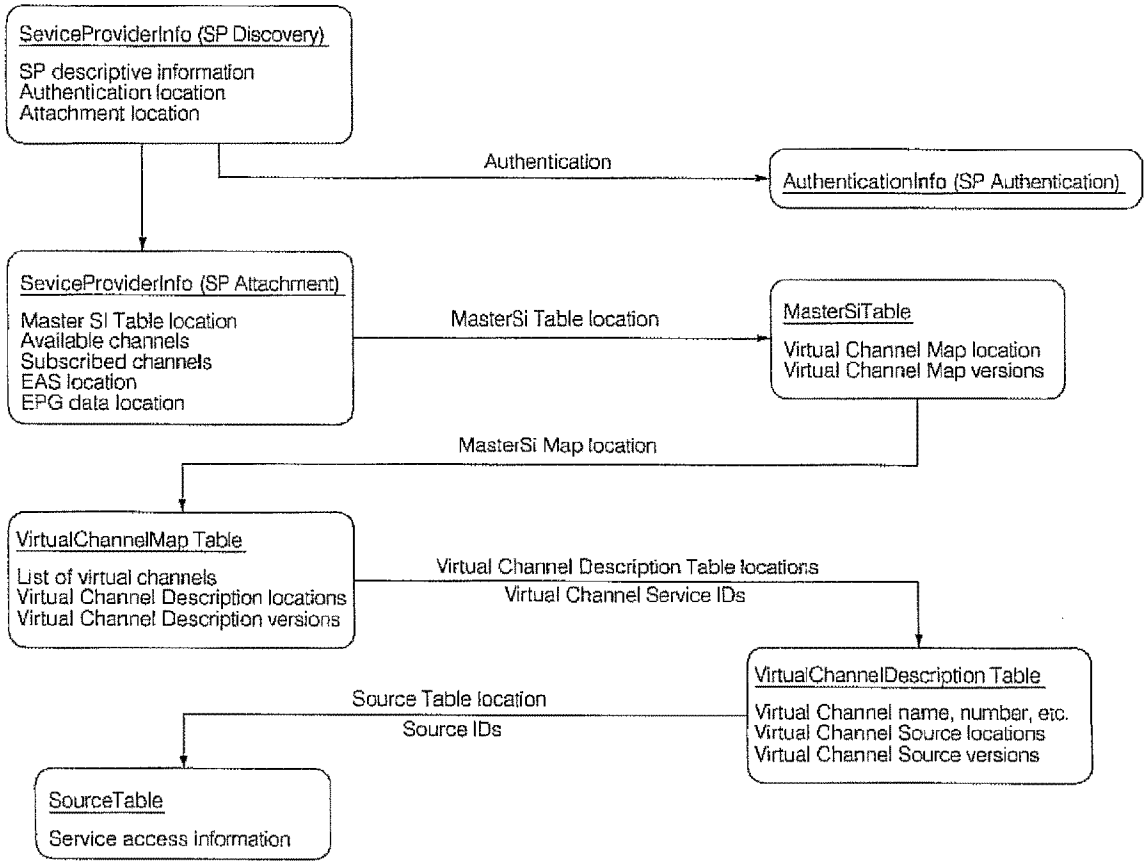
FIG. 4 illustrates data accessed during the operation of FIG. 3.

FIG. 4 illustrates an example of data used in the signal flow illustrated in FIG. 3, and a relationship among data in the SI. Referring to FIG. 4, a Master SI Table may contain information about the location and version of each Virtual Channel MAP. Each Virtual Channel MAP is identified by its Virtual Channel MAP identifier. VirtualChannelMAPVersion specifies the version number of the Virtual Channel MAP. If any of the tables connected to the Master SI Table in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. Hence, a change in any lower table may lead to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a region, subscriber or subscriber group basis. Thus, it is possible to provide a customized service to a subscriber according to a region in which the subscriber is located and subscriber information regarding the subscriber.

A Virtual Channel Map Table may contain a list of one or more virtual channels. A Virtual Channel Map includes not details of the channels but information about the locations of the details of the channels. In the Virtual Channel Map Table, VirtualChannelDescriptionLocation specifies the location of a Virtual Channel Description Table that provides virtual channel descriptions.

The Virtual Channel Description Table contains the details of the virtual channels. The Virtual Channel Description Table can be accessed using VirtualChannelDescriptionLocation of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table may be delivered in four logically separate flows, in a push mode or a pull mode. For version management, the Master SI Table may be multicast, and thus, a version change may be monitored by receiving a multicast stream of the Master SI Table.

Figure 5:
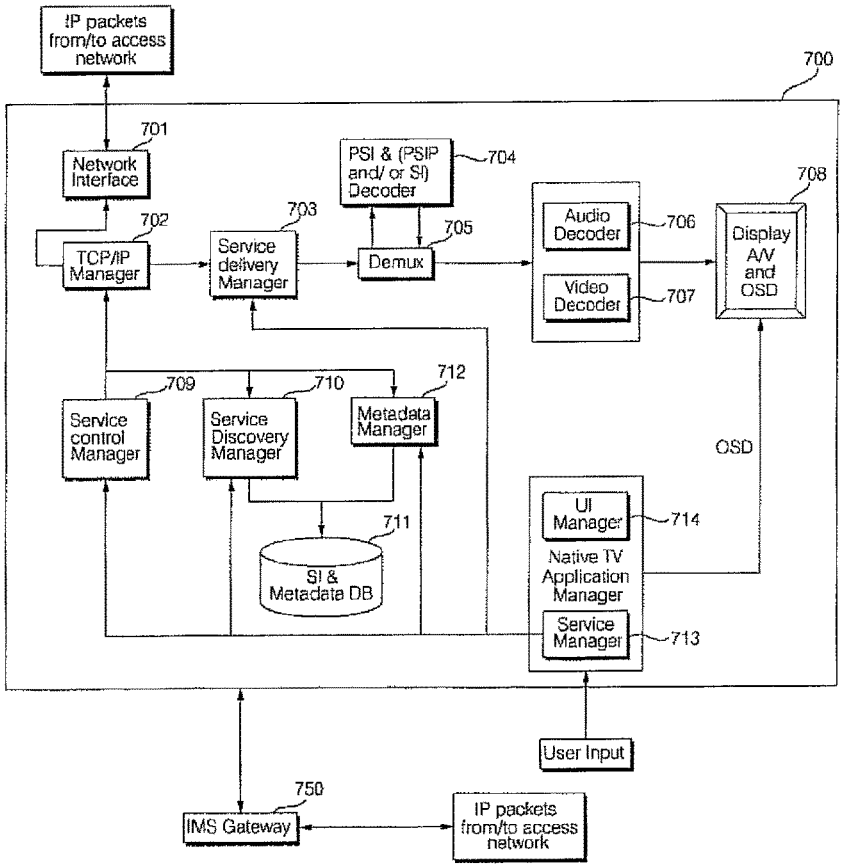
FIG. 5 is a block diagram of an image display apparatus according to an embodiment of the present disclosure.

FIG. 5 is a detailed block diagram of the image display apparatus of FIG. 1 or 2 according to an embodiment of the present disclosure. Referring to FIG. 5, an image display apparatus 700 may includes a network interface 701, a Transmission Control Protocol/Internet Protocol (TCP/IP) manager 702, a service delivery manager 703, a Demultiplexer (DEMUX) 705, a Program Specific Information (PSI) & (Program and System Information Protocol (PSIP) and/or SI) decoder 704, a display A/V and On Screen Display (OSD) module 708, a service control manager 709, a service discovery manager 710, a metadata manager 712, an SI & metadata DataBase (DB) 711, a User Interface (UI) manager 714, a service manager 713, or another appropriate component based on the application of the display apparatus.

The network interface 701 may transmit packets to and receives packets from a network. Specifically, the network interface 701 may receive services and content from an SP over the network.

The TCP/IP manager 702 is involved in packet reception and transmission of the image display apparatus 700, that is, packet delivery from a source to a destination. The TCP/IP manager 702 may classify received packets according to appropriate protocols and may output the classified packets to the service delivery manager 705, the service discovery manager 710, the service control manager 709, and/or the metadata manager 712.

The service delivery manager 703 may control received service data. For example, when controlling real-time streaming data, the service delivery manager 703 may use the Real-time Transport Protocol/Real-time Transport Control Protocol (RTP/RTCP). If real-time streaming data is transmitted over RTP/RTCP, the service delivery manager 703 may parse the received real-time streaming data using RTP and output the parsed real-time streaming data to the DEMUX 705. The service deliver manager 703 may also store the parsed real-time streaming data in the SI & metadata DB 711 under the control of the service manager 713. In addition, the service delivery manager 703 may feed back network reception information to a server that provides the real-time streaming data service using RTCP.

The DEMUX 705 may demultiplex a received packet into audio data, video data, and PSI data and outputs the audio data, video data, and PSI data to the audio decoder 706, the video decoder 707, and the PSI & (PSIP and/or SI) decoder 704, respectively.

The PSI & (PSIP and/or SI) decoder 704 may decode SI such as PSI. More specifically, the PSI & (PSIP and/or SI) decoder 704 may decode PSI sections, PSIP sections, or SI sections received from the DEMUX 705. The PSI & (PSIP and/or SI) decoder 704 may construct an SI DB by decoding the received sections and may store the SI DB in the SI & metadata DB 711.

The audio decoder 706 and the video decoder 707 may decode the audio data and the video data received from the DEMUX 705 and may output the decoded audio and video data through the display A/V and OSD module 708.

The UI manager 714 and the service manager 713 may manage the overall state of the image display apparatus 700, provide UIs, and manage other managers. The UI manager 714 may provide a Graphical User Interface (GUI) in the form of an OSD and may perform a reception operation corresponding to a key input received from the user. For example, upon receipt of a key input signal regarding channel selection from the user, the UI manager 714 may transmit the key input signal to the service manager 713.

The service manager 713 may control managers associated with services, such as the service delivery manager 703, the service discovery manager 710, the service control manager 709, and/or the metadata manager 712. The service manager 713 may also make a channel map and may select a channel using the channel map according to the key input signal received from the UI manager 714. The service manager 713 may set the audio/video Packet ID (PID) of the selected channel based on SI about the channel received from the PSI & (PSIP and/or SI) decoder 704.

The service discovery manager 710 may provide information necessary to select an SP that provides a service. Upon receipt of a channel selection signal from the service manager 713, the service discovery manager 710 may detect a service based on the channel selection signal.

The service control manager 709 may manage selection and control services. For example, if a user selects live broadcasting, such as a conventional broadcasting service, the service control manager may select and control the service using Internet Group Management Protocol (IGMP) or Real-Time Streaming Protocol (RTSP). If the user selects Video on Demand (VoD), the service control manager 709 may select and control the service. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols disclosed herein are given by way of example, and other protocols may be applicable in other embodiments.

The metadata manager 712 may manage metadata related to services and store the metadata in the SI & metadata DB 711. The SI & metadata DB 711 may store the SI decoded by the PSI & (PSIP and/or SI) decoder 704, the metadata managed by the metadata manager 712, and the information required to select an SP, received from the service discovery manager 710. The SI & metadata DB 711 may store setup data for the system. The SI & metadata DB 711 may be constructed in a Non-Volatile RAM (NVRAM) or a flash memory. Moreover, an IMS gateway 705 is a gateway equipped with functions needed to access IMS-based IPTV services.

Figure 6:
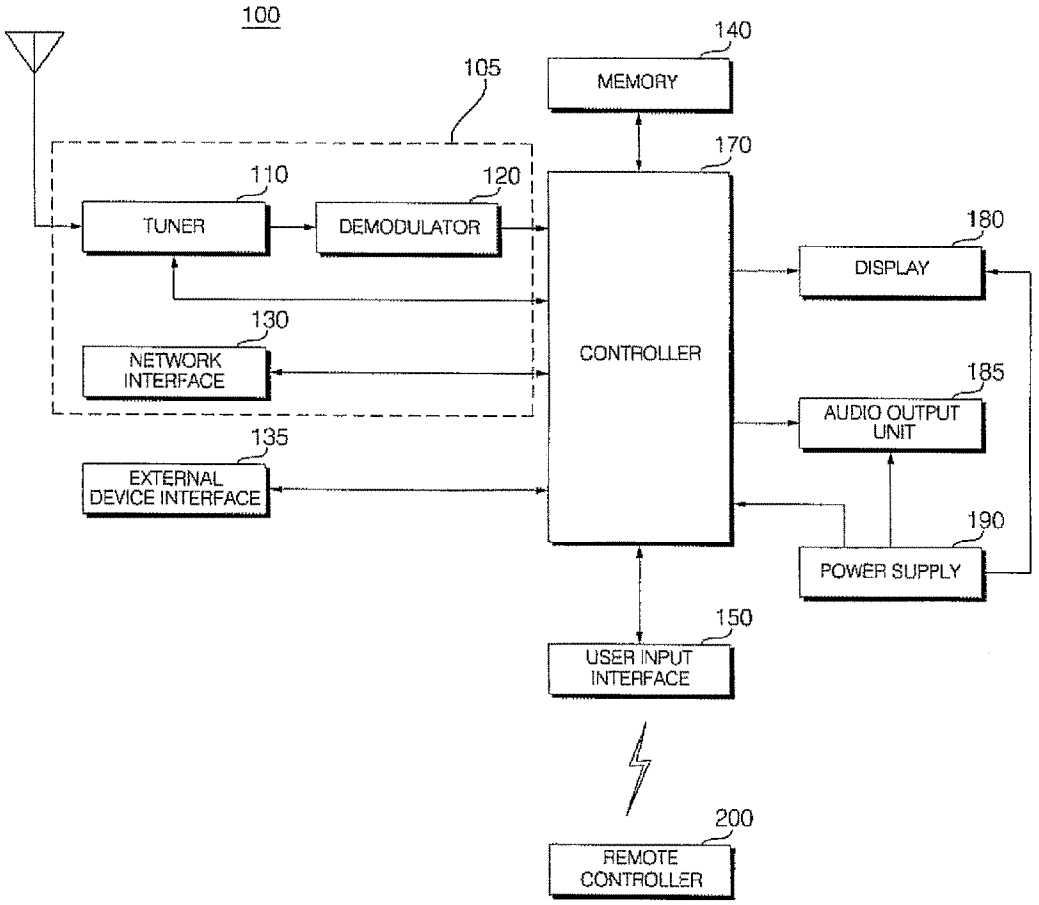
FIG. 6 is a block diagram of an image display apparatus according to another embodiment of the present disclosure.

FIG. 6 is a block diagram of the image display apparatus of FIG. 1 or 2 according to another embodiment of the present disclosure. Referring to FIG. 6, the image display apparatus 100 may include a broadcasting receiver 105, an external device interface 135, a memory 140, a user input interface 150, a controller 170, a display 180, an audio output circuit 185, a power supply 190, a camera module, or another appropriate component based on the application of the display apparatus 100. The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user from among a plurality of RF broadcast signals received through an antenna. The tuner 110 may downconverts the selected RF broadcast signal into a digital Intermediate Frequency (IF) signal or an analog baseband A/V signal.

More specifically, if the selected RF broadcast signal is a digital broadcast signal, the tuner 110 downconverts the selected RF broadcast signal into a digital IF signal DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband NV signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The broadcast signal may be input through the external device interface 135 or network interface 130 in addition to the tuner 110. In one embodiment, the image display apparatus may not include the tuner.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder, a de-interleaver, and/or a Reed-Solomon decoder so as to perform convolution decoding, de-interleaving, and/or Reed-Solomon decoding, respectively.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload. In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output circuit 185, respectively.

The external device interface 135 may serve as an interface between an external device and the image display apparatus 100. For interfacing, the external device interface 135 may include an A/V Input/Output (I/O) interface and/or a wireless communication module.

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video, and data signals from or to the external device, the external device interface 135 may includes the A/V I/O interface and/or the wireless communication module.

The A/V I/O interface of the external device interface 135 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, a D-sub port, or another appropriate port for connecting to an external device.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports, and thus, may receive data from or transmit data to the various set-top boxes. The external device interface 135 may receive applications or an application list from an adjacent external device and provide the applications or the application list to the controller 170 or the memory 140.

The network interface 130 may serve as an interface between the image display apparatus 100 and a wired/wireless network such as the Internet. The network interface 130 may include an Ethernet port for connection to a wired network. The wireless communication module of the external signal I/O circuit 128 may wirelessly access the Internet. For connection to wireless networks, the network interface 130 may use Wireless Local Area Network (WLAN) (i.e., Wi-Fi), Wireless Broadband (WiBro), World Interoperability for Microwave Access (WiMax), High Speed Downlink Packet Access (HSDPA), or another wireless communication protocol.

The network interface 130 may transmit data to or receive data from another user or electronic device over a connected network or another network linked to the connected network. For example, the network interface 130 may transmit data stored in the image display apparatus 100 to a user or electronic device selected from among users or electronic devices pre-registered with the image display apparatus 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD files, broadcast signals as well as information related to the content from a CP or an NP. Also, the network interface 130 may receive update information about firmware and update files of the firmware from the NP. The network interface 130 may transmit data over the Internet or to the CP or the NP. The network interface 130 may selectively receive a desired application among open applications over a network.

In an embodiment of the present disclosure, when a game application is executed in the image display apparatus 100, the network interface 130 may transmit data to or receive data from a user terminal connected to the image display apparatus 100 through a network. In addition, the network interface 130 may transmit specific data to or receive specific data from a server that records game scores.

The memory 140 may store various programs necessary for the controller 170 to process and control signals, and may also store processed video, audio and data signals. The memory 140 may temporarily store a video, audio and/or data signal received from the external device interface 135 or the network interface 130. The memory 140 may store information about broadcast channels by the channel-add function. The memory 140 may store applications or a list of applications received from the external device interface 135 or the network interface 130. The memory 140 may also store a variety of platforms. In one embodiment, when the image display apparatus 100 executes a game application, the memory 140 may store user-specific information and game play information about a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), a Read-Only Memory (ROM) such as an Electrically Erasable and Programmable Read Only Memory, or another appropriate type of storage device. The image display apparatus 100 may reproduce content stored in the memory 140 (e.g. video files, still image files, music files, text files, or application files). While the memory 140 is shown in FIG. 6 as being configured to be separate from the controller 170, the present disclosure is not limited thereto. For example, the memory 140 may be incorporated into the controller 170.

The user input interface 150 transmits a signal received from the user to the controller 170 or transmits a signal received from the controller 170 to the user. For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys, such as inputs of a power key, a channel key, and a volume key, and setting values. Also, the user input interface 150 may transmit a control signal received from a sensor that senses a user gesture to the controller 170 or transmit a signal received from the controller 170 to the sensor. The sensor may include a touch sensor, a voice sensor, a position sensor, a motion sensor, or another appropriate type of sensor.

The controller 170 may demultiplex the stream signal TS received from the tuner 110, the demodulator 120, or the external device interface 135 into a number of signals and process the demultiplexed signals into audio and video data. The video signal processed by the controller 170 may be displayed as an image on the display 180. The video signal processed by the controller 170 may also be transmitted to an external output device through the external device interface 135. The audio signal processed by the controller 170 may be output to the audio output device 185. Also, the audio signal processed by the controller 170 may be transmitted to the external output device through the external device interface 135.

The controller 170 may include a DEMUX and a video processor. In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. The controller 170 may also access a network and download an application or application list selected by the user to the image display apparatus 100 over the network. For example, the controller 170 may control the tuner 110 to receive a channel selected according to a specific channel selection command received through the user input interface 150 and process a video, audio and/or data signal of the selected channel. The controller 170 may output the processed video or audio signal along with information about the user-selected channel to the display 180 or the audio output device 185.

The controller 170 may also output a video or audio signal received from an external device such as a camera or a camcorder through the external device interface 135 to the display 180 or the audio output device 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display apparatus 100, received broadcast content, and external input content. The content includes at least one of a broadcast image, an external input image, an audio file, a still image, a Web page, or a text file.

In one embodiment, upon receipt of a go-to-home screen input, the controller 170 may control display of the home screen on the display 180. The home screen may include a plurality of card objects classified according to content sources. The card objects may include at least one card object representing a thumbnail list of broadcast channels, a card object representing a broadcast program guide, a card object representing a program reservation list or a program recording list, or a card object representing a media list of a device connected to the image display apparatus 100. The card objects may further include at least one of a card object representing a list of connected external devices or a card object representing a call-associated list. The home screen may further include an application menu with at least one application that can be executed.

The image display apparatus according to the embodiment of the present disclosure may include a card object generator that generates and displays the card object. In one embodiment, the card object generator may be an OSD generator 340 or a functional part included in the controller or another component.

Upon receipt of a card object move input, the controller 170 may control movement of a card object corresponding to the card object move input on the display 180, or if the card object is not displayed on the display 180, the controller 170 may control the display to show the card object on the display 180. When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The broadcast image may be fixed in size through a lock setting. The controller 170 may also control a display of a set-up object for at least one of image setting, audio setting, screen setting, reservation setting, setting of a pointer controlled by the remote controller, or network setting on the home screen.

The controller 170 may control display of a login object, a help object, or an exit object on a part of the home screen. The controller 170 may also control display of an object representing the total number of available card objects or the number of card objects displayed on the display 180 among all card objects, on a part of the home screen. Moreover, if one of the card objects displayed on the display 180 is selected, the controller 170 may display the selected card object as a fullscreen image to cover the entirety of the display 180.

Upon receipt of an incoming call at a connected external device or the image display apparatus 100, the controller 170 may control the display to focus-on or shift a call-related card object among the plurality of card objects. Furthermore, if an application view menu item is selected, the controller 170 may control display of applications or a list of applications that are available in the image display apparatus or downloadable from an external network.

The controller 170 may control installation and execution of an application downloaded from the external network along with various UIs. Also, the controller 170 may control display of an image related to the executed application on the display 180, upon user selection.

In an embodiment of the present disclosure, when the image display apparatus 100 provides a game application, the controller 170 may control assignment of player IDs to specific user terminals, creation of game play information by executing the game application, transmission of the game play information to the user terminals through the network interface 130, and reception of the game play information at the user terminals.

The controller 170 may control detection of user terminals connected to the image display apparatus 100 over a network through the network interface 130, display of a list of the detected user terminals on the display 180, and reception of a selection signal indicating a user terminal selected for use as a user controller from among the listed user terminals through the user input interface 150.

The controller 170 may control output of a game play screen of the game application, inclusive of player information about each user terminal and game play information, through the display 180. The controller 170 may determine the specific signal received from a user terminal through the network interface 130 as game play information, and thus, control the game play information to be reflected in the game application in progress. Moreover, the controller 170 may control transmission of the game play information about the game application to a specific server connected to the image display apparatus 100 over a network through the network interface 130. In one embodiment, upon receipt of information about a change in the game play information from the server through the network interface 130, the controller 170 may control output of a notification message in a predetermined area of the display 180.

The image display apparatus 100 may further include a channel browsing processor configured to generate thumbnail images corresponding to channel signals or external input signals. The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded.

Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

Examples of thumbnails and methods of using the same are disclosed in application Ser. No. 12/651,730, which is hereby incorporated by reference.

The display 180 may convert a processed video signal, a processed data signal, and an OSD signal received from the controller 170 or a video signal and a data signal received from the external device interface 135 into RGB signals to generate drive signals. The display 180 may be various types of displays such as a Plasma Display Panel (PDP), a Liquid Crystal Display (LCD), an Organic Light-Emitting Diode (OLED) display, a flexible display, a 3D display, or another appropriate type of display. The display 180 may also be a touch screen that can be used not only as an output device but also as an input device.

The audio output device 185 may receive a processed audio signal (e.g., a stereo signal, a 3.1-channel signal or a 5.1-channel signal) from the controller 170 and output the received audio signal as sound. The audio output device 185 may employ various speaker configurations.

To sense a user gesture, the image display apparatus 100 may further include a sensor circuit that has at least one of a touch sensor, a voice sensor, a position sensor, and a motion sensor, as stated before. A signal sensed by the sensor may be output to the controller 170 through the user input interface 150.

The image display apparatus 100 may further include the camera for capturing images of a user. Image information captured by the camera may be input to the controller 170. The controller 170 may sense a user gesture from an image captured by the camera or a signal sensed by the sensor. The controller 170 may also combine the captured image and the sensed signal to generate an input signal.

The power supply 190 supplies power to the image display apparatus 100. Particularly, the power supply 190 may supply power to the controller 170, the display 180, and the audio output device 185, which may be implemented as a System On Chip (SOC). The power supply 190 may include a converter for converting Alternating Current (AC) into Direct Current (DC). If the display 180 is configured with, for example, a liquid crystal panel having a plurality of backlight lamps, the power supply 190 may further include an inverter capable of performing Pulse Width Modulation (PWM) to control the luminance or dimming.

The remote controller 200 may transmit a user input to the user input interface 150. For transmission of user input, the remote controller 200 may use various communication techniques such as Bluetooth, RF communication, IR communication, UWB, ZigBee, or another appropriate communication protocol.

In addition, the remote controller 200 may receive a video signal, an audio signal or a data signal from the user input interface 150 and output the received signals visually, audibly, or as vibrations.

The above-described image display apparatus 100 may be a fixed digital broadcast receiver capable of receiving at least one of ATSC (8-VSB) broadcast programs, DVB-T (COFDM) broadcast programs, and/or ISDB-T (BST-OFDM) broadcast programs.

The block diagram of the image display apparatus 100 illustrated in FIG. 6 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Unlike the configuration illustrated in FIG. 6, the image display apparatus 100 may be configured so as to receive and playback video content through the network interlace 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 and the audio output device 185, a DVD player, a Blu-ray player, a game console, a computer, or another appropriate device that processes image signals. The set-top box is described in further detail hereinbelow with reference to FIGS. 7 and 8.

Figure 7:
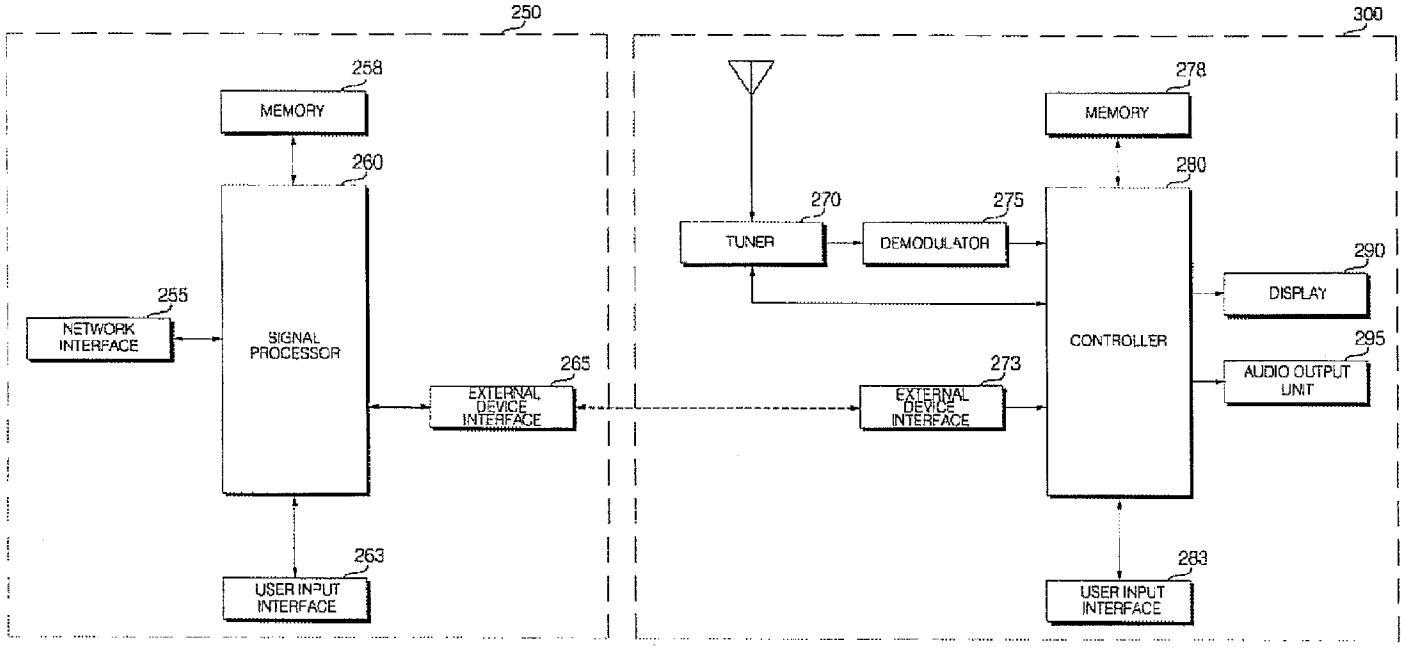
FIGS. 7 and 8 are block diagrams showing a set-top box and a display device of an image display apparatus according to an embodiment of the present disclosure.
Figure 8:
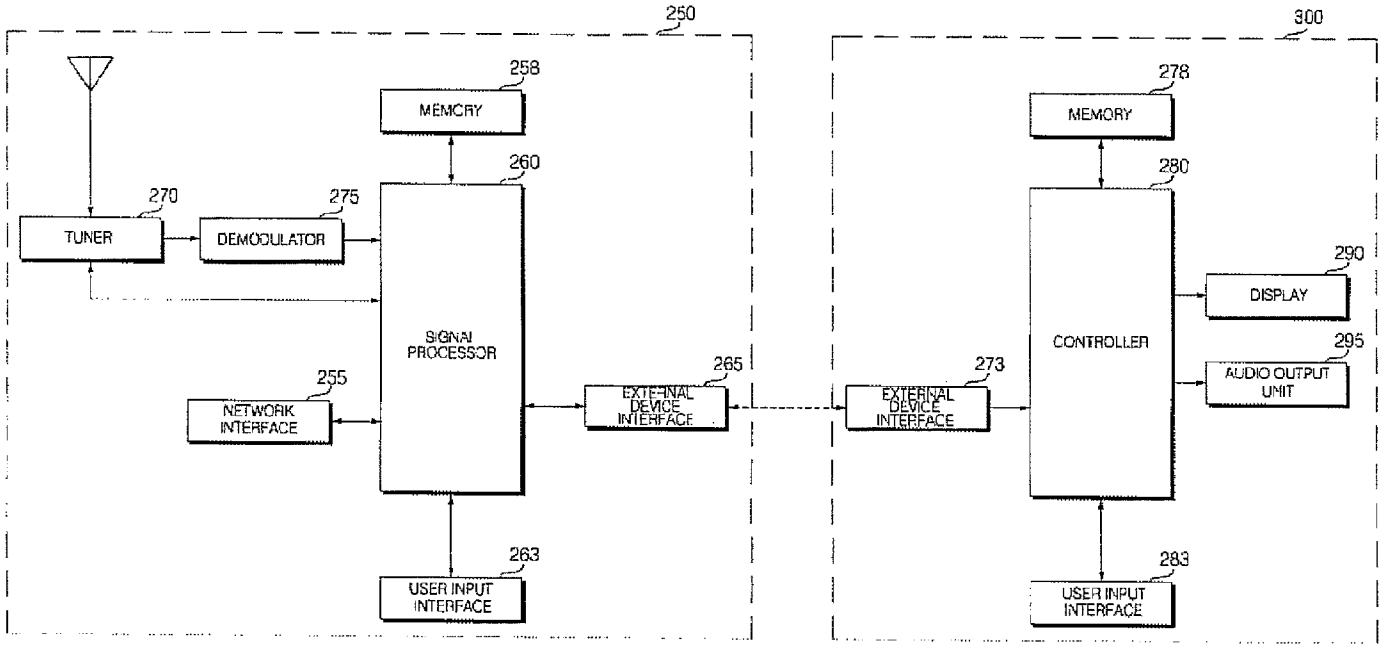

FIGS. 7 and 8 are block diagrams showing the image display apparatus configured separately as a set-top box and a display device. Referring to FIG. 7, a set-top box 250 and a display device 300 may transmit or receive data wirelessly or by wire. The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interlace 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms, described in further detail with reference to FIGS. 11 and 12 hereinafter.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 may transmit a signal received from the user to the signal processor 260 or a signal received from the signal processor 260 to the user. For example, the user input interface 263 may receive various control signals such as a power on/off signal, an operation input signal, or a setting input signal through activation of a local key or the remote controller 200, and may output the control signals to the signal processor 260.

The external device interface 265 may serve as an interface between the set-top box 250 and an external device that is connected wirelessly or by wire, particularly the display device 300, for signal transmission or reception. The external device interface 265 may also interface with an external device such as a game console, a camera, a camcorder, a computer (e.g. a laptop computer), or another appropriate external device, for data transmission or reception.

The set-top box 250 may further include a media input device for media playback. The media input device may be a Blu-ray input device, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output device 295. The tuner 270, the demodulator 275, the memory 278, the controller 280, the user input interface 283, the display 290, and the audio output device 295 are identical respectively to the tuner 110, the demodulator 120, the memory 140, the controller 170, the user input interface 150, the display 180, and the audio output device 185 as described in reference to FIG. 6, and thus, a description thereof is not repeated hereinbelow.

The external device interface 273 serves as an interface between the display device 300 and a wireless or wired external device, particularly the set-top box 250, for data transmission or reception. Hence, a video signal or an audio signal received through the set-top box 250 may be output through the display 290 or the audio output unit 295 through the controller 280.

Referring to FIG. 8, the configuration of the set-top box 250 and the display device 300 illustrated in FIG. 8 is similar to that of the set-top box 250 and the display device 300 as described with reference to FIG. 7, except that the tuner 270 and the demodulator 275 are provided in the set-top box 250, not in the display device 300. Here, the signal processor 260 may process a broadcast signal received through the tuner 270 and the demodulator 275. The user input interface 263 may receive a channel selection input, a channel store input, etc.

Figure 9:
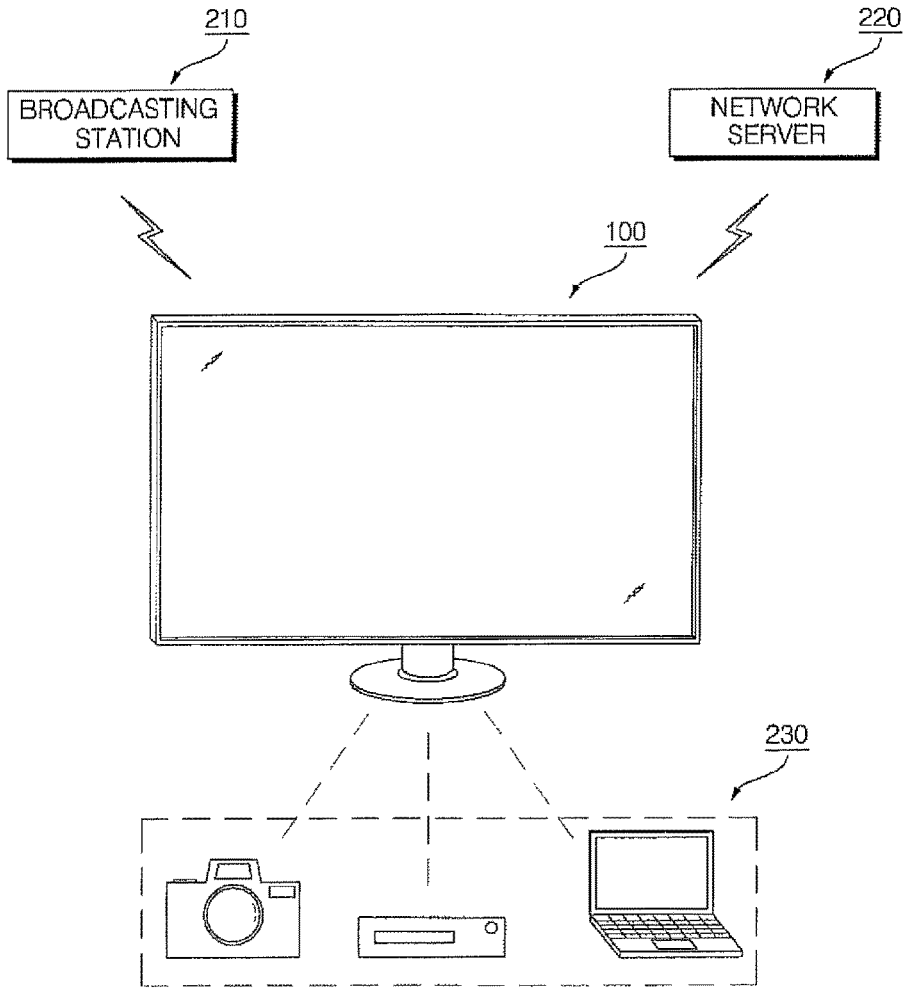
FIG. 9 shows a plurality of external devices in communication with an image display apparatus according to an embodiment of the present disclosure.

FIG. 9 illustrates an operation for communicating with third devices in the previously disclosed embodiments of the image display apparatus according to an embodiment. Referring to FIG. 9, the image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals embedded in the broadcast signal or the data signal of the broadcast signal, for example, into a format suitable for transmission from the image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A CP may provide content to the image display apparatus 100 through the network server 220.

The image display apparatus 100 may communicate with the external device 230. The external device 230 can transmit and receive signals directly to and from the image display apparatus 100 wirelessly or by wire. For instance, the external device 230 may be a media memory device or a multimedia player. That is, the external device 230 may be any of a camera, a DVD player, a Blu-ray player, a PC, or another appropriate device based on the required functionality.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230, and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 10:
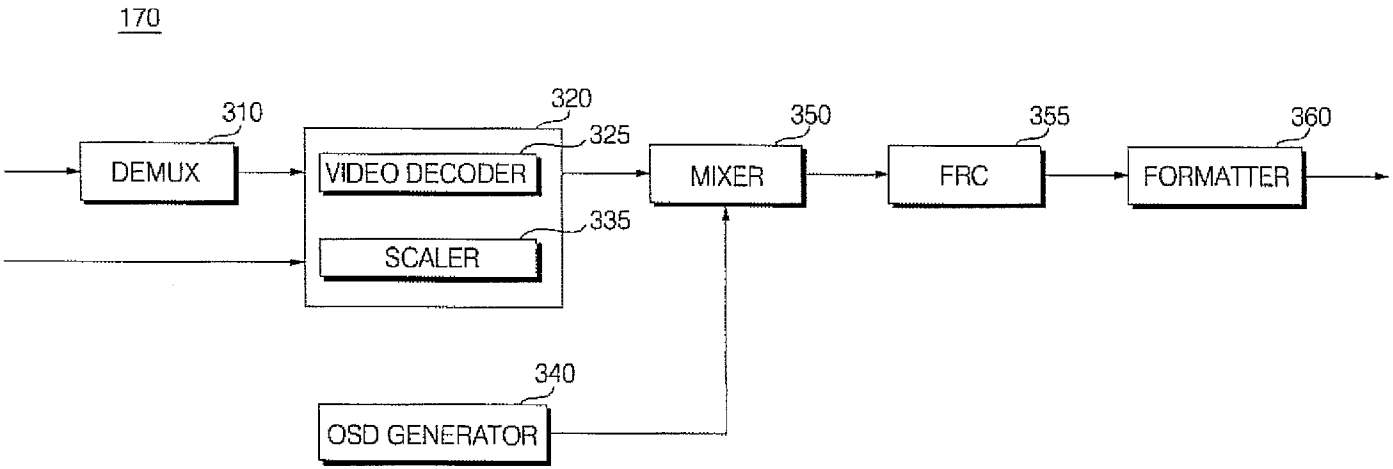
FIG. 10 is a block diagram of a controller of an image display apparatus according to an embodiment of the present disclosure.

FIG. 10 is a block diagram of the controller of FIG. 6. Referring to FIG. 10, the controller 170 may include a DEMUX 310, a video processor 320, an OSD generator 340, a mixer 350, a Frame Rate Converter (FRC) 355, and a formatter 360. The controller 170 may further include an audio processor and a data processor.

The DEMUX 310 may demultiplex an input stream. For example, the DEMUX 310 may demultiplex an MPEG-2 TS into a video signal, an audio signal, or a data signal. The input stream signal may be received from the tuner 110, the demodulator 120, or the external device interface 135.

The video processor 320 may process the demultiplexed video signal. For video signal processing, the video processor 320 may include a video decoder 325 and a scaler 335. The video decoder 325 decodes the demultiplexed video signal and the scaler 335 scales the resolution of the decoded video signal so that the video signal can be displayed on the display 180.

The video decoder 325 may be provided with decoders that operate based on various standards. If the demultiplexed video signal is, for example, an MPEC-2 encoded video signal, the video signal may be decoded by an MPEC-2 decoder. On the other hand, if the video signal is an H.264-encoded DMB or DVB-handheld (DVB-H) signal, the video signal may be decoded by an H.264 decoder. The video signal decoded by the video processor 320 may be provided to the mixer 350.

The OSD generator 340 may generate an OSD signal autonomously or based on to user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc. For example, the OSD generator 340 may generate a signal by which subtitles are displayed with a broadcast image or Electronic Program Guide (EPG)-based broadcasting information.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz may be converted into a frame rate of 120 or 240 Hz. When the frame rate is to be changed from 60 Hz to 120 Hz, a first frame may be inserted between the first frame and a second frame, or a predicted third frame may be inserted between the first and second frames. If the frame rate is to be changed from 60 Hz to 240 Hz, three identical frames or three predicted frames may be inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor of the controller 170 may process a demultiplexed audio signal. For audio signal processing, the audio processor may have a plurality of decoders. If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, an AC-3 decoder, or another type of decoder based on the format of the audio signal. The audio processor of the controller 170 may also adjust the bass, treble or volume of the audio signal.

The data processor of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI may be included in the header of a TS, i.e., a 4-byte header of an MPEG-2 TS.

The controller 170 as embodied and broadly described herein is not limited to the configuration as illustrated in the block diagram of FIG. 10. Depending upon the specifications of the controller 170, the components of the controller 170 may be combined, omitted, or additional components may be added to the controller 170.

Figure 11:
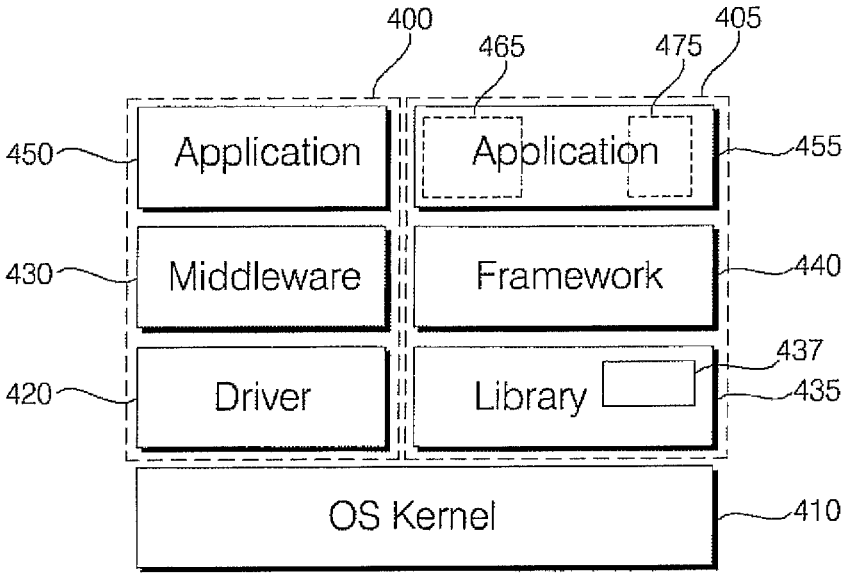
FIG. 11 illustrates a platform architecture for an image display apparatus according to an embodiment of the present disclosure.
Figure 12:
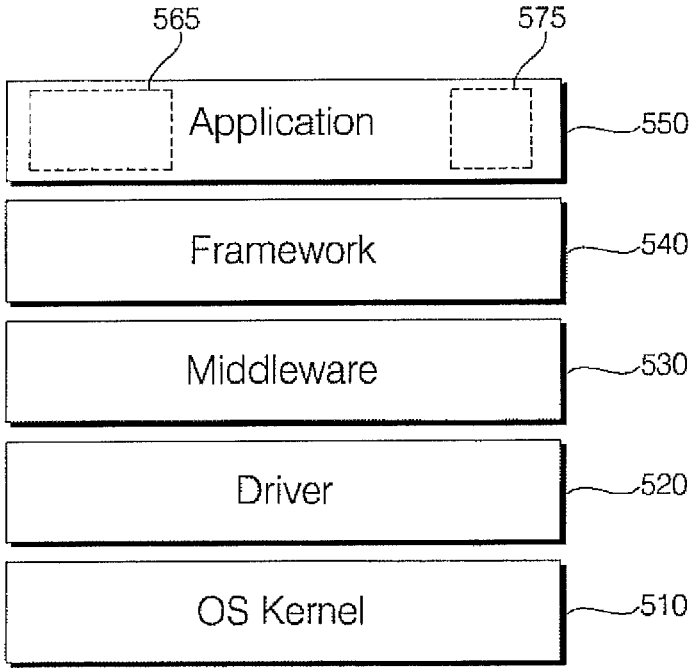
FIG. 12 illustrates a platform architecture for an image display apparatus according to another embodiment of the present disclosure.

FIG. 11 illustrates a platform architecture implemented in the image display apparatus according to one embodiment, and FIG. 12 illustrates another platform architecture implemented in the image display apparatus according to another embodiment.

A platform for the image display apparatus may have OS-based software to implement the above-described operations. Referring to FIG. 11, a platform for the image display apparatus may be a separate type. For example, the platform may be designed separately as a legacy system platform 400 and a smart system platform 405. An OS kernel 410 may be shared between the legacy system platform 400 and the smart system platform 405.

The legacy system platform 400 may include a stack including a driver 420, middleware 430, and an application layer 450 on the OS kernel 410. On the other hand, the smart system platform 405 may have a stack including a library 435, a framework 440, and an application layer 455 on the OS kernel 410.

The OS kernel 410 is the core of an operating system. When the image display apparatus is driven, the OS kernel 410 may be responsible for the operation of at least one of hardware drivers, security protection for hardware and processors in the image display apparatus, efficient management of system resources, memory management, hardware interfacing by hardware abstraction, multi-processing, or scheduling associated with the multi-processing. Meanwhile, the OS kernel 410 may further perform power management operations.

The hardware drivers of the OS kernel 410 may include, for example, at least one of a display driver, a Wi-Fi driver, a Bluetooth driver, a USB driver, an audio driver, a power manager, a binder driver, or a memory driver. Moreover, the hardware drivers of the OS kernel 410 may also include drivers for hardware devices within the OS kernel 410. The hardware drivers may include a character device driver, a block device driver, and/or a network device driver. The block device driver may need a buffer to buffer data on a block basis as data may be transmitted on a block basis. The character device driver may not need a buffer since data may be transmitted on a basic data unit basis, that is, on a character basis. The OS kernel 410 may be implemented based on any of various OSs such as Unix (Linux), Windows, etc. The OS kernel 410 may be a general-purpose open OS kernel which can be implemented in other electronic devices.

The driver 420 may be interposed between the OS kernel 410 and the middleware 430. Along with the middleware 430, the driver 420 may drive devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers may operate in conjunction with the hardware drivers of the OS kernel 410.

In addition, the driver 420 may further include a driver for the remote controller 200, especially a pointing device as described below. The remote controller driver may reside in the OS kernel 410 or the middleware 430, instead of the driver 420.

The middleware 430 may reside between the OS kernel 410 and the application layer 450. The middleware 430 may mediate between different hardware devices or different software programs for data transmission and reception between the hardware devices or the software programs. Therefore, the middleware 430 can provide standard interfaces, support various environments, and enable interaction between tasks conforming to heterogeneous communication protocols. Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, or DLNA middleware as peripheral device communication-related middleware.

The application layer 450 that runs atop the middleware 430 in the legacy system platform 400 may include, for example, UI applications associated with various menus in the image display apparatus. The application layer 450 may allow editing and updating over a network by user selection. With use of the application layer 450, the user may enter a desired menu among various UIs by manipulating the remote controller 210 while viewing a broadcast program. The application layer 450 may further include at least one of a TV guide application, a Bluetooth application, a reservation application, a Digital Video Recorder (DVR) application, and a hot-key application.

In the smart system platform 405, the library 435 may be positioned between the OS kernel 410 and the framework 440, and may form the basis of the framework 440. For example, the library 435 may include Secure Socket Layer (SSL) being a security-related library, WebKit being a Web engine-related library, C library (libc), and Media Framework being a media-related library that specifies, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 may form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver of the OS kernel 410 may operate. The binder driver and the runtime 437 may connect Java applications to C-based libraries. The library 435 and the runtime 437 may correspond to the middleware 430 of the legacy system platform 400.

In the smart system platform 405, the framework 440 may include programs on which applications of the application layer 455 are based. The framework 440 may be compatible with any application and may allow component reuse, movement, or exchange. The framework 440 may include supporting programs and programs for interconnecting different software components. For example, the framework 440 may include an activity manager related to activities of applications, a notification manager, and/or a CP for abstracting common information between applications. This framework 440 may be written in Java.

The application layer 455 on top of the framework 440 may include a variety of programs that are executed and displayed in the image display apparatus. The application layer 455 may include, for example, a core application suite having at least one of an e-mail, Short Message Service (SMS), calendar, map, browser, or another appropriate application based on the desired functionality. The application layer 455 may be written in Java.

In the application layer 455, applications may be categorized into user-undeletable applications 465 or user-installed/deletable applications 475. User-undeletable applications 465 may be applications stored in the image display apparatus 100 that cannot be modified. User-installable or user-deletable applications 475 may include application which may be downloaded from an external device or a network and stored in the image display apparatus.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 12, a platform for the image display apparatus according to another embodiment may be an integrated type. The integrated platform may include an OS kernel 510, a driver 520, middleware 530, a framework 540, and an application layer 550. Compared to the separate-type platform, as illustrated in FIG. 11, the integrated-type platform is characterized by the absence of the library 435. Moreover, in this embodiment, the application layer 550 may be an integrated layer. The driver 520 and the framework 540 correspond to the driver 420 and the framework 440 of FIG. 5, respectively.

The library 435 of FIG. 11 may be incorporated into the middleware 530. That is, the middleware 530 may include both the legacy system middleware and the image display system middleware. As previously described, the legacy system middleware may include MHEG or ACAP as data broadcasting-related middleware, PSIP or SI middleware as broadcasting information-related middleware, and DLNA middleware as peripheral device communication-related middleware, whereas the image display system middleware may include SSL as a security-related library, WebKit as a Web engine-related library, libc, and Media Framework as a media-related library. The middleware 530 may further include the runtime as previously described.

The application layer 550 may include a menu-related application, a TV guide application, a reservation application, etc. as legacy system applications. The application layer 550 may also include an e-mail, SMS, a calendar, a map, and/or a browser as image display system applications.

In the application layer 550, applications may be categorized into user-undeletable applications 565 that are stored in the image display apparatus and user-installable or user-deletable applications 575 that are downloaded from an external device or a network and stored in the image display apparatus.

Based on the afore-described platforms illustrated in FIGS. 11 and 12, a variety of Application Programming Interfaces (APIs) and Software Development Kits (SDKs) necessary to develop applications may be opened. APIs may implement functions that provide connectivity to specific sub-routines for execution of the functions within a program. APIs may also be implemented as programs.

For example, sources related to hardware drivers of the OS kernel 410, such as a display driver, a WiFi driver, a Bluetooth driver, a USB driver or an audio driver, may be opened. Related sources within the driver 420 such as a driver for a microcomputer, a display module, a GPU, an FRC, an SDEC, a VDEC, an ADEC or a pointing device may be opened. In addition, sources related to PSIP or SI middleware as broadcasting information-related middleware or sources related to DLNA middleware may be opened. The various open APIs may allow developers to create applications executable in the image display apparatus 100 or applications required to control operations of the image display apparatus 100 based on the platforms as illustrated in FIGS. 11 and 12.

The platforms of FIGS. 11 and 12 may be general-purpose platforms that can be implemented in many other electronic devices as well as in the image display apparatus as disclosed herein. The platforms may be stored or loaded in the memory 140, the controller 170, or any other processor. To execute applications, an additional application processor may be further provided.

Figure 13A:
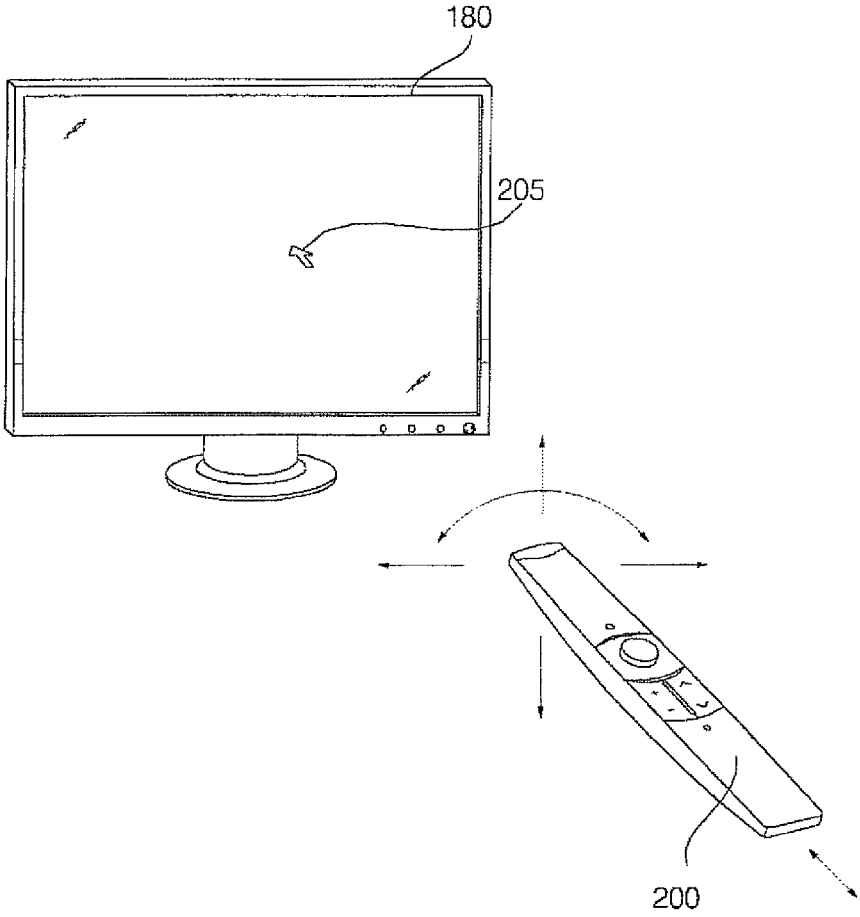
FIGS. 13A to 13C illustrate a remote controller controlling a pointer displayed on an image display apparatus according to an embodiment of the present disclosure.
Figure 13B:
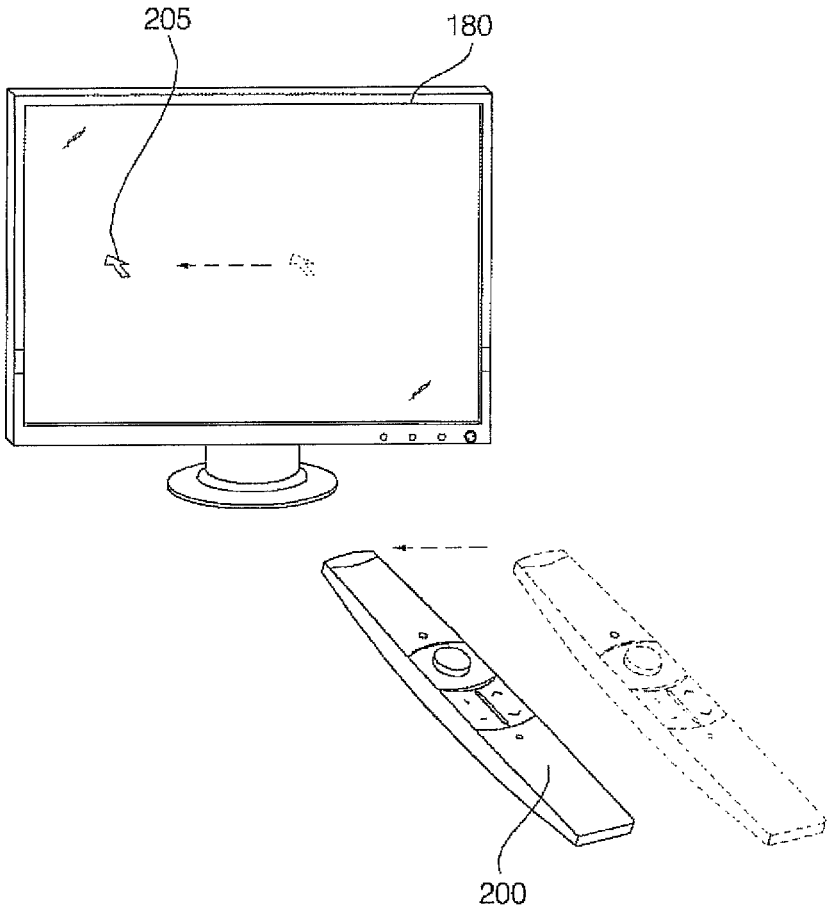
Figure 13C:
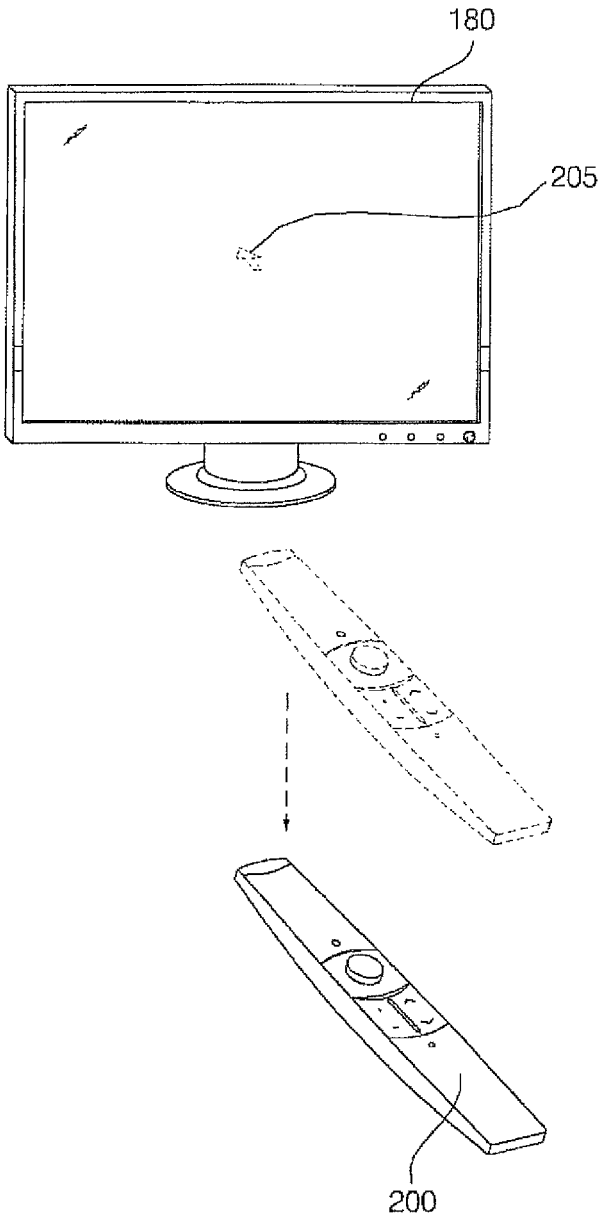

FIGS. 13A to 13C illustrates a method for controlling the image display apparatus using a remote controller according to an embodiment of the present disclosure. Referring to FIG. 13A, a pointer 205 representing movement of the remote controller 200 may be displayed on the display 180. The remote controller 210 may be a motion sensing remote controller that senses a movement of the remote controller 210. The user may move or rotate the remote controller 200 up and down, side to side (FIG. 13B), and back and forth (FIG. 13C). Since the pointer 205 moves in accordance with the movement of the remote controller 200, the remote controller 200 may be referred to as a pointing device.

Referring to FIG. 13B, if the user moves the remote controller 200 to the left, the pointer 205 may move to the left on the display 180 in response thereto. A sensor provided on the remote controller 200 may detect the movement of the remote controller 200 and transmit corresponding motion information to the image display apparatus. Then, the image display apparatus may determine the movement of the remote controller 200 based on the motion information received from the remote controller 200. The controller may then calculate the coordinates of a target location to which the pointer 205 should be shifted in accordance with the movement of the remote controller 200. The image display apparatus may then display the pointer 205 at the calculated coordinates.

Referring to FIG. 13C, the remote controller 200 may be moved away from the display 180 while a predetermined button on the remote controller 200 is depressed. Then, a selected area corresponding to the pointer 205 may be zoomed in to enlarge a image on the display 180. On the contrary, if the user moves the remote controller 200 toward the display 180, the area corresponding to the pointer 205 may be zoomed out, and thus, reducing the size of the image on the display 180. The opposite may also be possible. That is, when the remote controller 200 moves away from the display 180, the selection area may be zoomed out and when the remote controller 200 approaches the display 180, the selection area may be zoomed in.

With the predetermined button pressed on the remote controller 200, an up, down, left or right movements of the remote controller 200 may be ignored. That is, when the remote controller 200 moves away from or approaches the display 180, only the back and forth movements (e.g., the distance from the display 180) of the remote controller 200 are sensed, while the up, down, left and right movements of the remote controller 200 are ignored. When the predetermined button is not selected at the remote controller 200, the pointer 205 may move in accordance with the up, down, left or right movement of the remote controller 200. Moreover, the speed and direction of the pointer 205 on the display 180 may correspond to the speed and direction of the remote controller 200. The sensitivity of the pointer 205 relative to the movement of the remote controller 200 may be adjusted.

The pointer 205 is an object displayed on the display 180 in correspondence with the movement of the remote controller 200. Therefore, the pointer 205 may have various shapes other than the arrow illustrated in FIGS. 13A to 130. For example, the pointer 205 may be a dot, a cursor, a prompt, a thick outline, etc. The pointer 205 may be displayed across a plurality of points, such as a line and a surface as well as at a single point on a horizontal and vertical axes.

Figure 14:
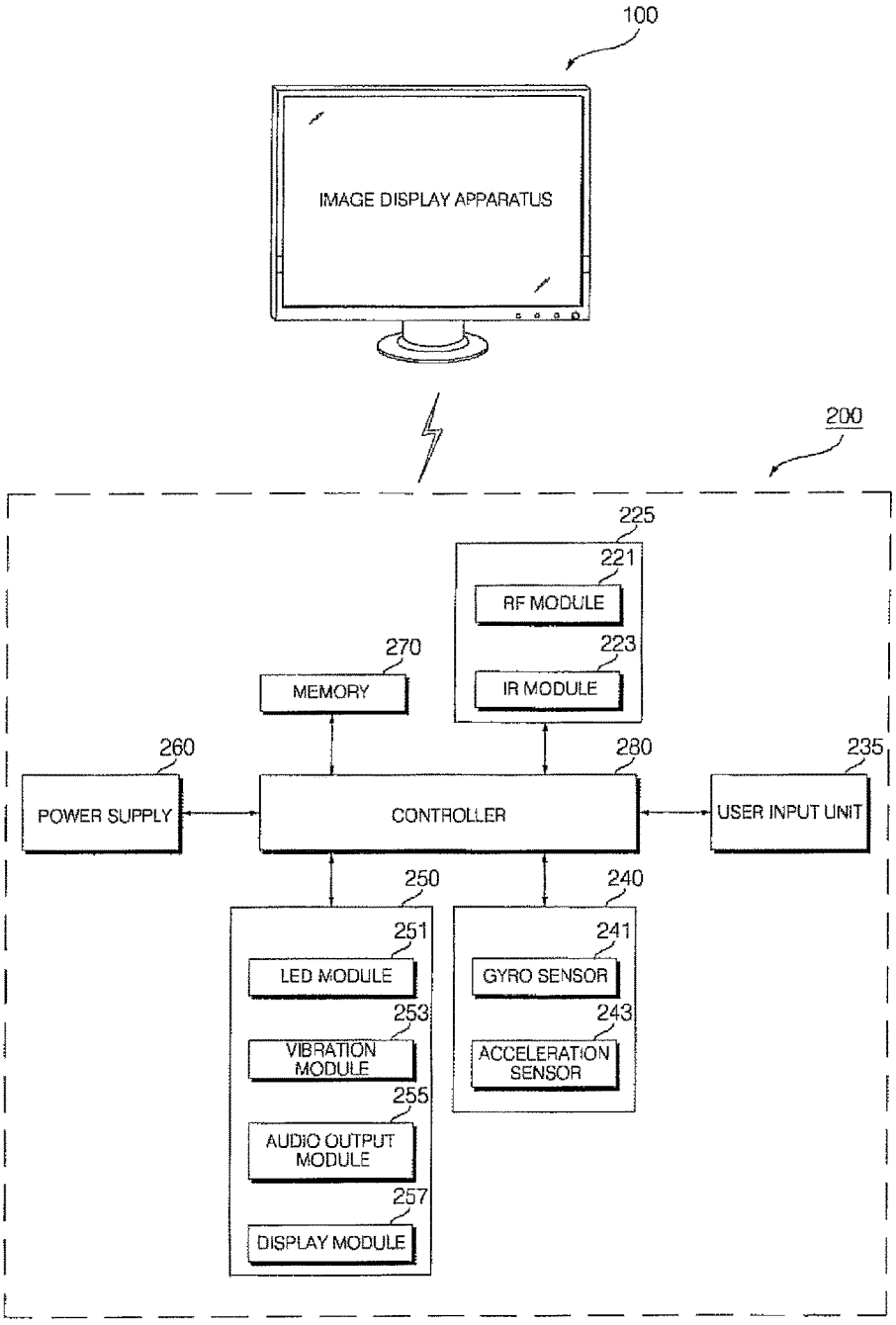
FIG. 14 is a block diagram of a remote controller according to an embodiment of the present disclosure.

FIG. 14 is a block diagram of the remote controller in the image display apparatus according to an embodiment of the present disclosure. Referring to FIG. 14, the remote controller 200 may include a wireless communication module 225, a user input device 235, a sensor 240, an output device 250, a power supply 260, a memory 270, a controller 280, or another appropriate component based on the application or desired functionality of the display device.

The wireless communication module 225 may transmit signals to and/or receives signals from the image display apparatus 100 as disclosed herein. The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

In this embodiment, the remote controller 200 may transmit motion information that represents a movement of the remote controller 200 to the image display apparatus 100 through the RF module 221. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223. In certain embodiments, the command signals may also be transmitted through the RF module 221.

The user input device 235 may include a keypad, a plurality of buttons, a touchpad and/or a touch screen. The user may enter commands to the image display apparatus 100 by manipulating the user input circuit 235. If the user input circuit 235 includes a plurality of hard buttons, the user may input various commands to the image display apparatus 100 by activating the hard buttons. Moreover, if the user input circuit 235 includes a touch screen displaying a plurality of soft keys, the user may input various commands to the image display apparatus 100 by touching the soft keys on the display 180. The user input device 235 may also include various input tools other than those set forth herein, such as a scroll key, a jog wheel, or another appropriate user input device.

The sensor 240 may include a gyro sensor 241 and/or an acceleration sensor 243. The gyro sensor 241 may sense a movement of the remote controller 200, for example, along the X-, Y-, and Z-axis, and the acceleration sensor 243 may sense the acceleration and speed of the remote controller 200. The sensor 240 may further include a distance sensor (proximity sensor) to sense the distance between the remote controller 200 and the display 180.

The output device 250 may output a video and/or audio signal corresponding to manipulation of the user input device 235 or corresponding to a signal received from the image display apparatus 100. The user may easily identify whether the user input device 235 has been manipulated or whether the image display apparatus 100 has been controlled, based on the video and/or audio signal output by the output device 250.

The output device 250 may include a Light Emitting Diode (LED) module 351 which may be activated whenever the user input circuit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the motion sensing remote controller 200 in order to save power. The power supply 260 may again supply power if a predetermined key on the motion sensing remote controller 200 is manipulated.

The memory 270 may store various types of programs and application data necessary to control or drive the remote controller 200. The motion sensing remote controller 200 may wirelessly transmit signals to and/or receive signals from the image display apparatus 100 over a predetermined frequency band with the aid of the RF module 221. The controller 280 of the remote controller 200 may store the frequency band information associated with the paired image display apparatus 100 in the memory 270 for subsequent use.

The controller 280 may provide overall control of the remote controller 200. The controller 280 may transmit a signal corresponding to a key manipulation detected from the user input device 235 or a signal corresponding to a motion of the motion sensing remote controller 200, as sensed by the sensor 240, to the image display apparatus 100.

Figure 15:
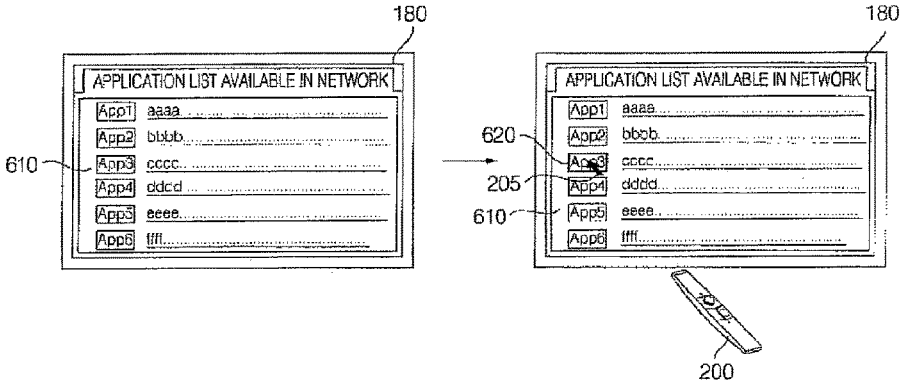
FIGS. 15 to 18 illustrate various types of a user interface (UI) in an image display apparatus according to embodiments of the present disclosure.

FIGS. 15 to 18 illustrate various types of UIs in an image display apparatus according to embodiments of the present disclosure. Referring to FIG. 15, an application list of applications available over a network may be displayed on the display 180. A user may access a CP or an NP directly, search for various applications, or download the applications from the CP or the NP.

Specifically, FIG. 15A illustrates the display 180 which displays an application list 610 of applications which may be available on a server connected to the display apparatus. The application list 610 may include an icon for each application as well as a brief description of the application. Because the image display apparatus as disclosed herein may have full browser functionality, the icons or the descriptions may be enlarged on the display 180 of the image display apparatus. Accordingly, the user may readily identify the desired applications, as described in further detail hereinafter. FIG. 15B illustrates a selection of one application 620 from the application list 610 using a pointer 205. The pointer 205 may be controlled by a movement of the remote controller 200. Thus, the selected application 620 may be easily selected, downloaded, or remotely executed over the network.

Figure 16:
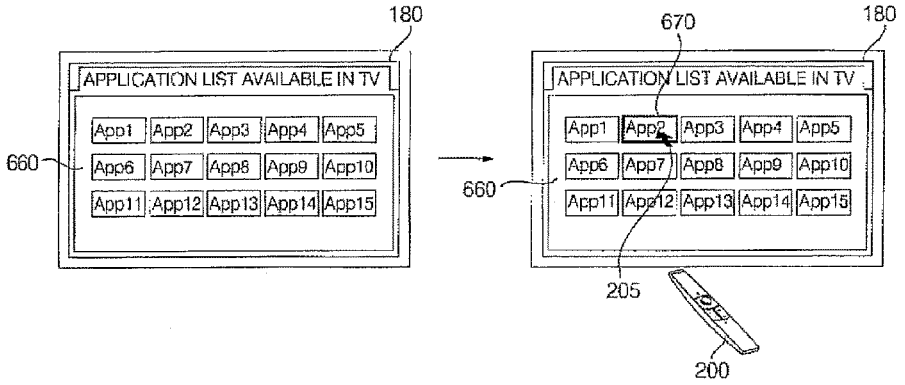

FIG. 16 illustrates an application list displayed on the display 180 according to another embodiment. Referring to FIG. 16, when an application list view menu is selected by manipulating the remote controller 200, a list of applications 660 stored in the image display apparatus may be displayed on the display 180. The icons may include identifying information related to the corresponding application to facilitate identification of the application. Moreover, while only icons representing the applications are shown in FIG. 16, the application list 660 may also include brief descriptions of the applications, as in the application list 610 of FIG. 15. Therefore, the user may access additional information to readily identify the applications if desired. FIG. 16(b) illustrates a selection of one application icon 670 from the application list 660 using the pointer 205. The pointer 205 may be controlled by moving the remote controller 200. Accordingly, the selected application 670 may be easily selected and executed.

Moreover, in certain embodiments, the application lists 610 or 660 may display icons representing both applications available over the network as well as applications available locally. In this embodiment, the icons or the descriptions may include additional indicia to differentiate the remote and local applications. For example, the description may include a network address for the corresponding application.

Furthermore, in certain embodiments, the icons may be thumbnails. While icons may include images which are related to the corresponding content (e.g., name or logo of a content server, an image representing a category, etc.), thumbnails may include a representation of the corresponding content (e.g., an image of the content). For example, if the thumbnail corresponds to a still image, a reduced sized version of the still image may be displayed on the thumbnail. Moreover, if the corresponding content is a video image (e.g., a broadcast content), a version of the video image may be played on the thumbnail.

While FIGS. 15 and 16 show that a desired application may be selected by moving the pointer 205 using the remote controller 200, the application may be selected in many other ways. For example, the user may select a specific application by moving a cursor around the display 180 using dedicated keys (e.g., arrow keys and an OK key) on the remote controller 200. In another example, if the remote controller 200 equipped with a touch pad, the pointer 205 may be controlled using the touch pad. Accordingly, the user may select a specific item using the pointer 205 and various types of input devices.

Figure 17:
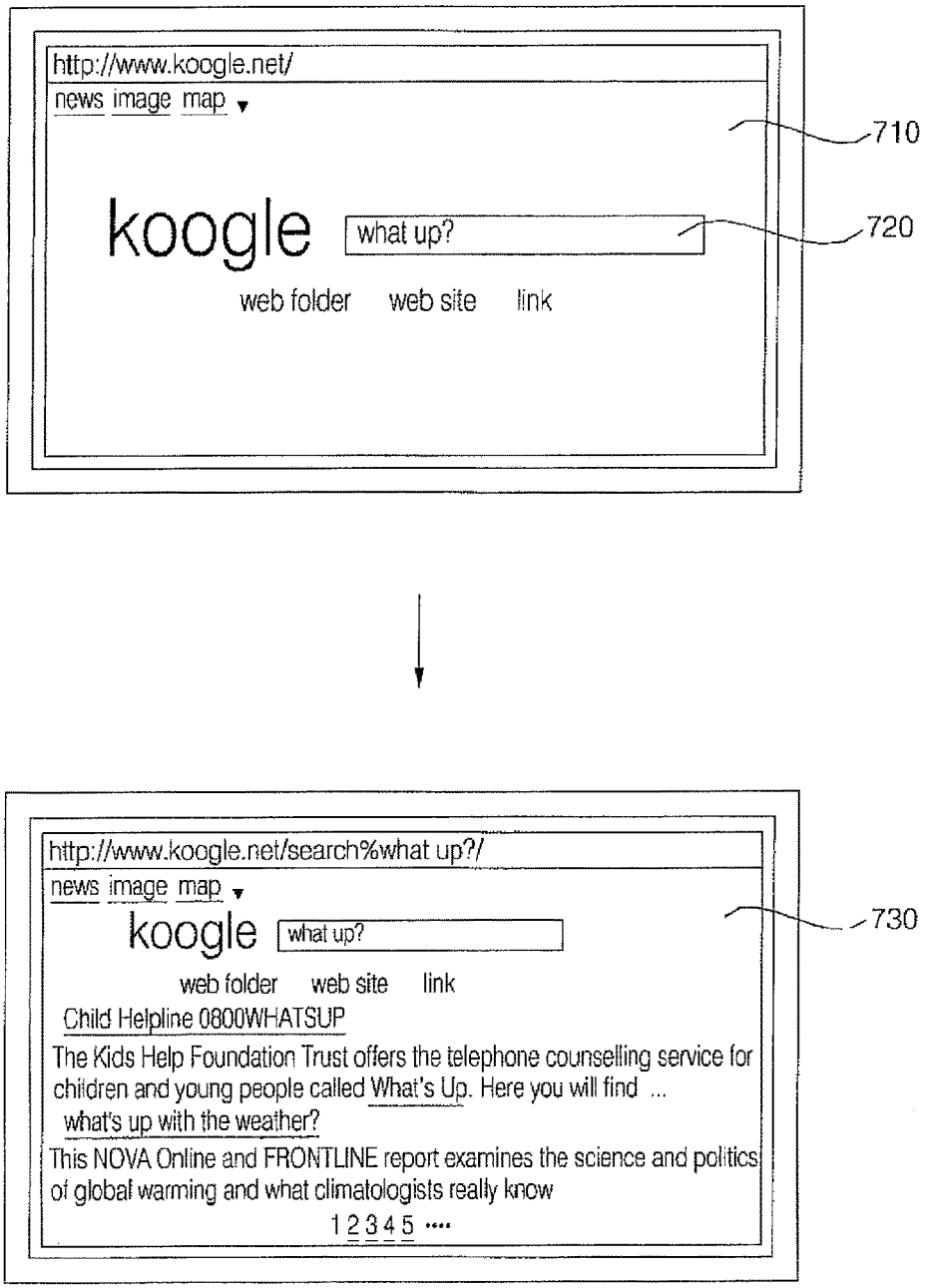

FIG. 17 illustrates a Web page displayed on the display 180. Specifically, FIG. 17 illustrates a Web page 710 with a search window 720 displayed on the display 180. A keyword or search string may be input to the search window 720 using a keypad displayed on the display 180, local keys provided on the display apparatus, or character keys provided on the remote controller 200.

FIG. 17 illustrates a search result page 730 which may display a search result matching the keyword entered in the search window 720. Since the image display apparatus may have browser functionalities, the user may access a Web page from the search result on the image display apparatus.

Figure 18:
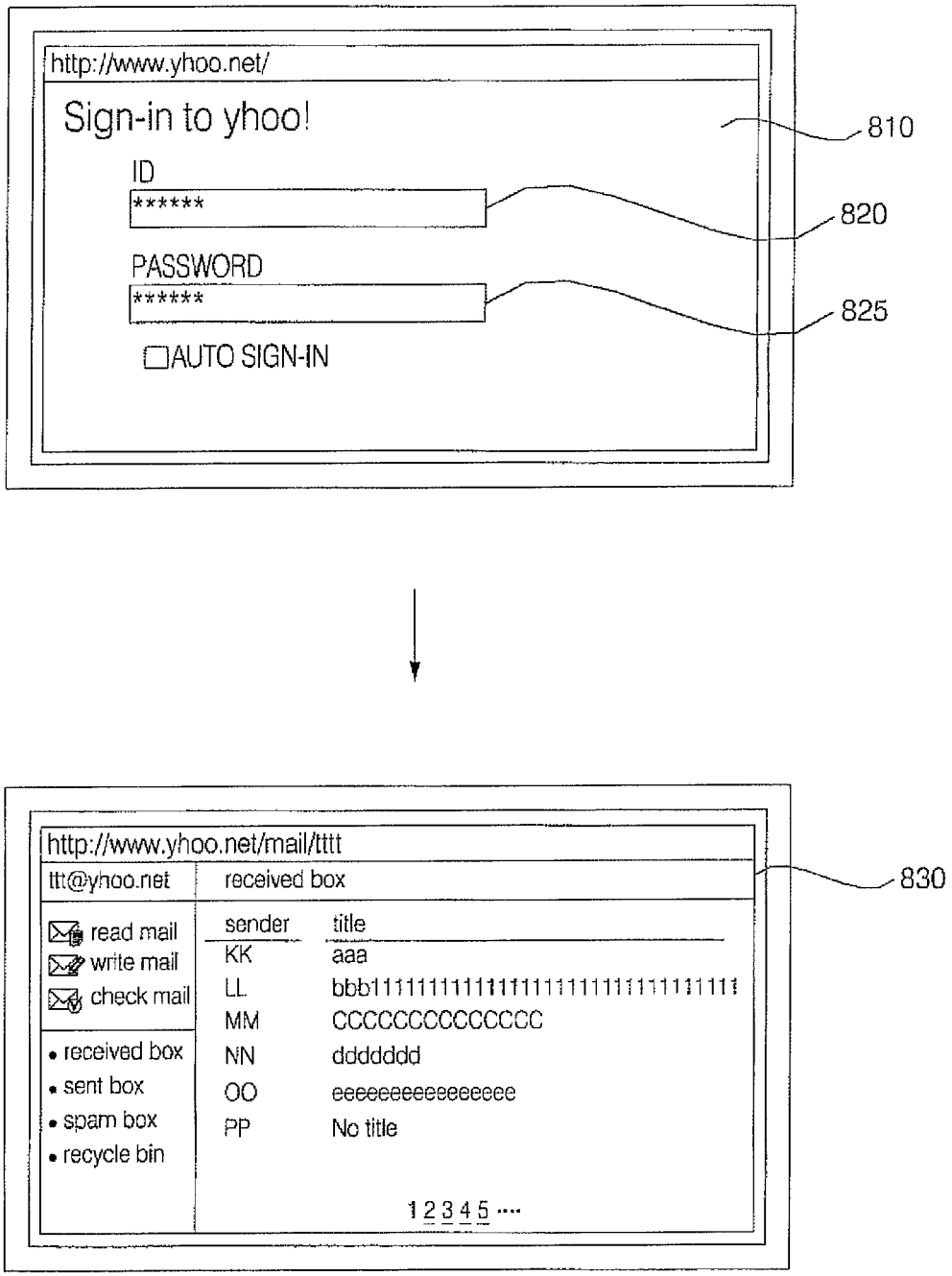

FIG. 18 illustrates another Web page displayed on the display 180. Specifically, FIG. 18 illustrates a mail service page 810, including an ID input window 820 and a password input window 825, displayed on the display 180. The user may enter an alphanumeric user ID and password into the ID input window 820 and the password input window 825. The user ID and password may be inputted using a keypad displayed on the mail service page 810, character keys provided as local keys, or character keys provided on the remote controller 200. Hence, the user may login to an online mail service using the image display apparatus.

FIG. 18 illustrates a mail page 830 which may be displayed on the display 180 after logging-in to the mail service. The mail page 830 may contains items "read mail," "write mail," "sent box," "received box," "recycle bin," or another appropriate mail related items. Moreover, in the "received box" item, mail may be sorted according to sender or by title. The image display apparatus may be configured to have full browser functionality when displaying the mail service page. Therefore, the user may conveniently access the mail service through the image display apparatus.

Figure 19:
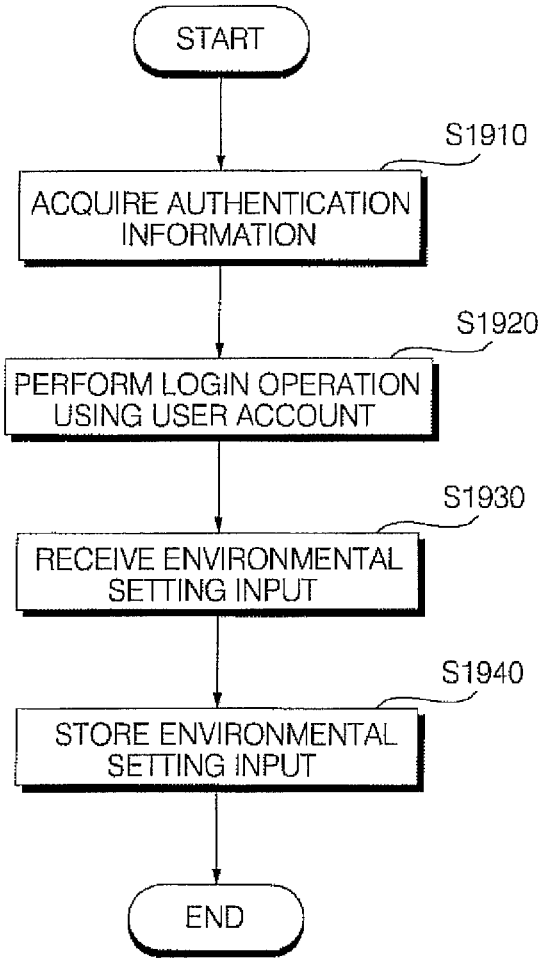
FIG. 19 is a flowchart of a method for operating an image display apparatus according to an embodiment.

FIG. 19 is a flowchart of a method for operating an image display apparatus according to an embodiment, and FIGS. 20 to 32 are screen images to illustrate the method of FIG. 19.

First, in the method for operating the image display apparatus according to this embodiment, user account authentication information may be acquired, in step S1910. The acquired authentication information may be a password input along with an ID (e.g., a user ID) using an input device such as a remote controller or an on-screen keyboard.

Alternatively, the acquired authentication information may be a photograph of a user's face (e.g., facial recognition information) captured through a camera connected to an external device interface 265. In one embodiment, the image display apparatus may further include a built-in camera. In this case, the user facial recognition information may be acquired through the built-in camera.

Alternatively, the image display apparatus may include an audio input device or may be connected to an external audio input device through the external device interface 265. Here, the acquired authentication information may be a user voice information.

Next, a login operation may be performed using a user account corresponding to the acquired authentication information, in step S1920.

The login operation of step S1920 may performed by comparing the acquired user account authentication information with the password information, facial recognition information, or voice information stored in the memory. That is, when the same authentication information as the stored authentication information has been acquired, the login operation may succeed to authenticate the user.

Facial recognition and voice recognition may be performed using various known facial recognition and voice recognition algorithms. Moreover, a method step of storing the password information, face information, or voice information for each user account in the memory may be included.

Then, an environmental setting input for each user account for screen configuration information of the user account may be received, in step S1930, and the environmental setting input for each user account may be stored in the memory according to user accounts, in step S1940.

The screen configuration information may include setting information of various screens provided by the image display apparatus. For example, the screen configuration information may include settings for the size and position of predetermined areas that may be configured to display various images therein. Within the designated areas, various objects may be configured to be displayed therein to form a display screen, including settings for the type, number, size, and/or position of various graphic objects included in the user account screen. The user may select items to be changed from the settings information and may change the screen configuration.

Figure 20:
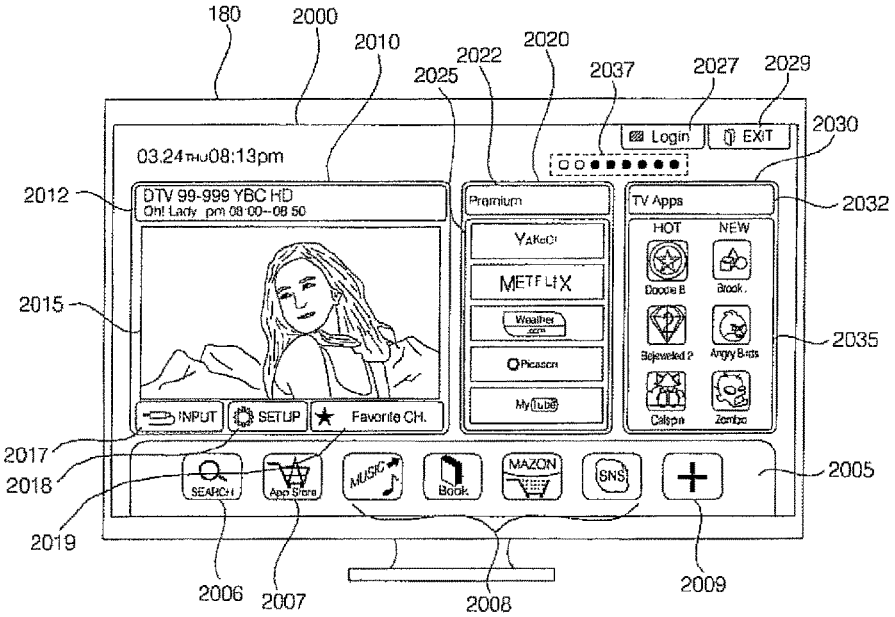
FIGS. 20 to 32 show screen images to illustrate the method of FIG. 19.

FIG. 20 shows a home screen displayed on a display. The configuration of the home screen 2000 as shown in FIG. 20, may be an example of a default screen of the above-described smart TV. The home screen 2000 may be set as an initial screen that may be displayed when the image display apparatus is powered on or wakes up from a standby mode, or as a default screen that may be displayed when a local key on the display device or a home key on the remote controller 200 is selected.

The home screen 2000 may include a card object area. The card object area may include a plurality of card objects 2010, 2020, and 2030 which may be categorized according to a predetermined criteria, for example, groups of content providers or content types.

The plurality of card objects may be generated by a card object generator of the image display apparatus 100. The card object generator may be included in the OSD generator 340 of the controller 170 or may be separately provided as a graphics processing unit. The plurality of card objects generated by the card object generator may be transmitted to and displayed on the display 180.

As shown in FIG. 20, a broadcast image card object 2010 (BROADCAST) for displaying a broadcast image, a CP card object 2020 (PREMIUM) for providing a CP list, and an application list card object 2030 (TV Apps) for providing a list of applications may be displayed on the display 180.

Various card objects may be provided, such as a CHANNEL BROWSER card object for providing a thumbnail list of broadcast channels, a TV GUIDE card object for providing a broadcast program guide list, a RESERVATION/REC card object for providing a program reservation list or a recorded program list, a MY MEDIA card object for providing a media list in the image display apparatus or an apparatus connected to the image display apparatus, or another appropriate card object having a particular category or groups of contents.

The card objects which are not displayed on the display 180 among the various card objects may be replaced and displayed according to user input. The controller or the card object generator may store and manage a sort and display order of the card objects, and may display various suitable card objects according to user commands.

The controller or the card object generator may set a virtual hidden area on one side of the screen so as to manage a sort and display order of the card objects, and provide an environment to allow movement of the card object from one side of the screen or the hidden area. For example, upon the movement or replacement of the card objects. The card objects may be scrolled on the display screen to show additionally available card objects.

The broadcast image card object 2010 which may display the broadcast image may contain a broadcast image 2015 received through the tuner 110 or the network interface 130, an object 2012 for providing information about the broadcast image, an object 2017 representing an external device, a setup object 2018, and a favorite channel object 2019.

For example, to display the broadcast image 2015, a stream signal output from the tuner 110, the demodulator 120, or the external device interface 135 may be demultiplexed by the DEMUX 310. The video decoder 325 may decode the demultiplexed video signal and the scaler 335 may scale the resolution of the decoded video signal so that the video signal can be displayed on the display 180. Next, the OSD generator 340 or the card object generator may display the broadcast image 2015 on the card object.

If a home screen display input is received while a broadcast image 2015 is displayed on the display 180 in fullscreen, the controller 170 may scale down the received broadcast image such that the scaled-down broadcast image is displayed in the broadcast image card object 2010. The scaling operation may be performed by a scaler included in the image processor 320 of the controller 170.

The card object generator may generate the broadcast image card object 2010 including the scaled-down broadcast image 2015 and the object 2012 for providing information about the broadcast image. The display 180 may display the generated broadcast image card object 2010, as shown in FIG. 20. Moreover, when the broadcast image 2015 is selected in the broadcast image card object 2010, the broadcast image 2015 may be displayed on the display 180 in fullscreen.

The object 2012 for providing information about the broadcast image 2015 may include a channel number (DTV7-1), a channel name (YBC HD), the title of a broadcast program (Oh! Lady), and air time (8:00-8:50 PM) of the broadcast program. Therefore, the information about the displayed broadcast image 2015 may be readily available to a viewer. If the object 2012 for providing the information about the broadcast image is selected, related EPG information may be displayed on the display 180. A date, day, and/or current time may be positioned on the broadcast image card object 2010.

The object 2017 may represent an external device connected to the image display apparatus 100. For example, if the object 2017 is selected, a list of external devices connected to the image display apparatus 100 may be displayed. The setup object 2018 may be used to set various settings of the image display apparatus 100, such as video settings, audio settings, screen settings, reservation settings, setting of the pointer 205 of the remote controller 200, network settings, or another appropriate setting. The FAVORITE CH object 2019 may be used to display a favorite channel. For example, when the FAVORITE CH object 2019 is selected, a favorite channel card object may be displayed.

The card object 2020 that includes a CP list may contain a card object name 2022 (PREMIUM) and a CP list 2025. While Yakoo, Metflix, weather.com, Pcason, and My tube are shown as CPs in the CP list 2025 in FIG. 20, it should be appreciated that many other configurations including various CPs may be possible. The card object generator may generate the card object 2020 that includes the CP list based on, for example, registered CPs. The generated CP card object 2020 may be displayed, as shown in the FIG. 20. If the card object name 2022 is selected, the card object 2020 may be displayed on the display 180 in fullscreen. This may be applied to other card objects. If a particular CP listed in the CP list 2025 is selected, a screen including a content list provided by the CP through the network interface 130 may be displayed on the display 180.

The card object 2030 showing an application list may include a card object name 2032 (TV Apps) and an application list 2035. Applications may be sorted into predetermined categories in the application list 2035. As shown in FIG. 20, applications may be sorted by popularity (HOT) and/or by time (NEW), or another appropriate category or type.

The card object generator may generate the card object 2030 that includes the application list using an application list received through the network interface 130. The generated application card object 2030 may be displayed as shown in FIG. 20. The application list may be received from a CP or a service provider which runs an App Store (e.g., a web site for purchasing and downloading applications online). Moreover, the card object 2030 may be generated using an application list previously stored in the memory 140. If a particular application item listed in the application list 2035 is selected, a screen that provides information about the application may be displayed on the display 180.

A Login menu item 2027, a Help menu item 2028, and/or an Exit menu item 2029 may be displayed above the card objects 2020 and 2030. The Login menu item 2027 may be used to log in to the APP STORE or a network connected to the image display apparatus. The Exit menu item 2029 may be used to exit the home screen. When the Exit menu item 2029 is selected, a received broadcast image may be displayed on the display 180 in fullscreen.

An indicator 2037 may be displayed above or under the card objects 2020 and 2030 to indicate the total number of available card objects as well as a relative position of the displayed card objects. Moreover, the indicator 2037 may indicate the number of card objects being displayed on the display 180. Furthermore, the card objects 2020 and 2030 displayed on the display 180 and the card objects hidden from the display 180 may be exchanged with each other (e.g., scroll the card objects).

An application menu 2005 may include a plurality of application items (e.g., icons representing the applications). Particularly, an application menu 2005 that includes a predetermined number of application items among all available application items may be displayed on the display 180. The predetermined number of applications may be pre-selected by the user or by the manufacturer as default selections. Thus, the application menu 2005 may be referred to herein as an application compact-view menu.

The application menu 2005 may be generated by an application menu generator of the image display apparatus 100. The application menu generator may be included in the OSD generator 340 of the controller 170 or may be separately provided as a graphic processing unit. The application menu generated by the application menu generator may be transmitted to and displayed on the display 180.

The application menu 2005 may be include items designated as mandatory application items 2006, 2007, and 2009 (Search, App Store or TV Apps, and +) and optional application items 2008 (Music, Book, MAZON, and SNS), as set by the user.

The mandatory application menu items 2006, 2007, and 2009 (Search, TV Apps, and '+') may be default items which the user is not permitted to edit. The search application menu item 2006 may provide a search function based on an input search keyword. The TV Apps (App Store) application menu item 2007 may enable direct user access to an application store. The '+' (View More) application menu item 2009 may invoke a function to view all displayed application items. The user-set application items 2008 (Music, Book, MAZON, and SNS) may be edited to represent applications, for instance, that the user frequently uses.

In the default home screen described with reference to FIG. 20, it may be difficult to change the screen configuration according to user preference, except for the user-set application items 2008 (Music, Book, MAZON, and SNS) of the application menu 2005. For example, in an image display apparatus which may be used by a plurality of users, a default home screen may be shared among all users. Hence, an image display apparatus as disclosed herein may provide a plurality of screen configurations on a user account basis to allow a user to customize a screen configuration based on the individual user's preference.

The screen configuration information may include area setting information to configure an area occupied by a home screen, card object setting information to set the number, type, size, and position of card objects included in the home screen, and setting information for the number, type, size, and position of various other objects which may be displayed in the areas or in the card objects.

Accordingly, setting information for each user account may be stored and an image based on environmental settings for each user account may be displayed. When a user logs in to the image display apparatus, a customized screen based on the setting information for the user account may be displayed.

In one embodiment, a method step to create a user account or to display a setup menu may be included. That is, the screen configuration setting may be configured when creating a new user account or while a setup menu is accessed to allow changes to the screen configuration information, e.g., the environmental settings.

Figure 21:
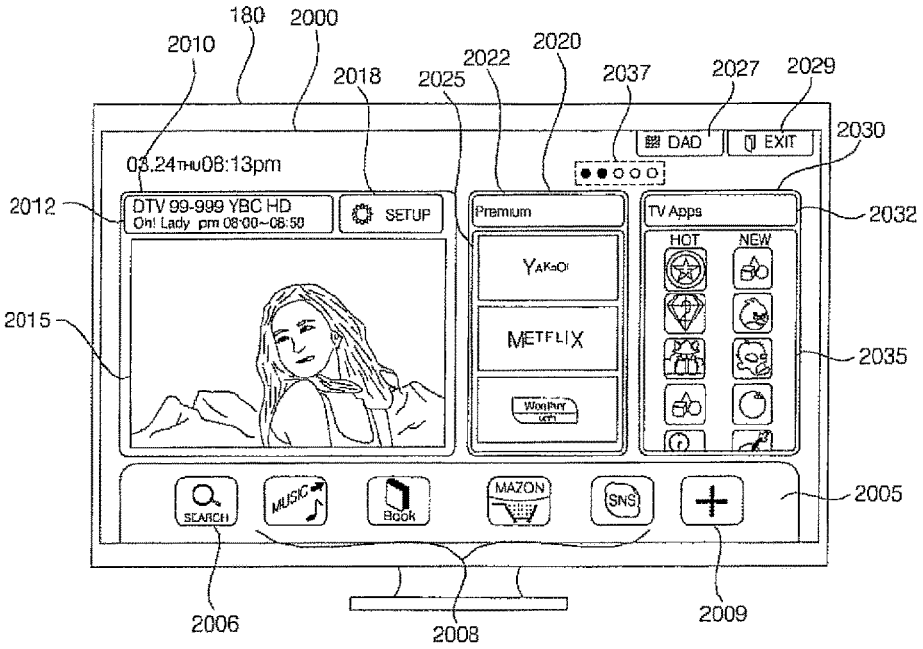
Figure 22:
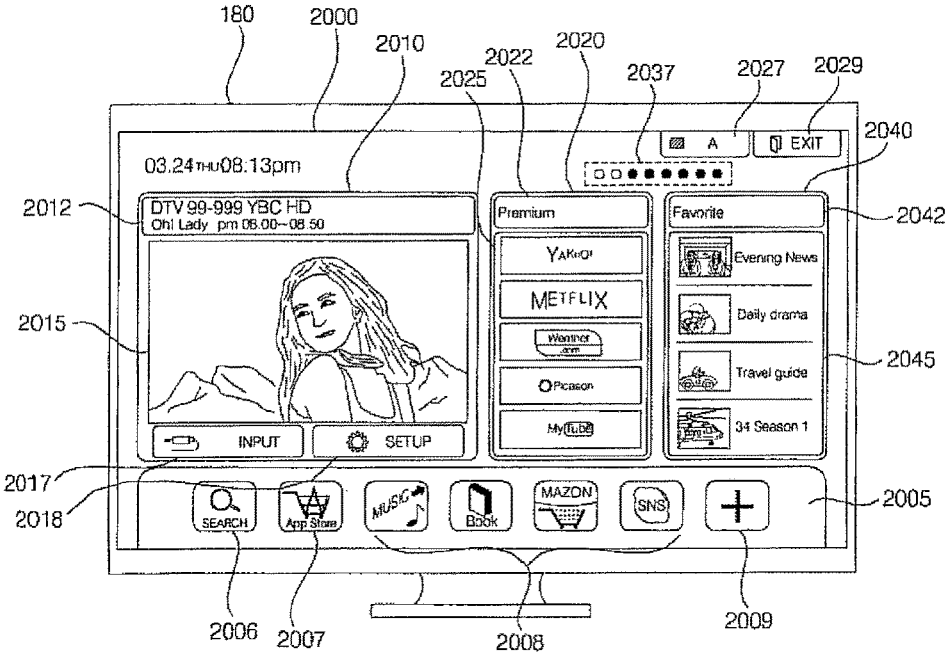

FIGS. 21 to 23 show various screen images illustrating a change in the home screen configuration. Referring to FIG. 21 with reference to FIG. 20, a user with an account "DAD" may, for example, customize the home screen to delete the external device object 2017 and the favorite channel object 2019 from the configuration of the broadcast card object 2010, may scale down the information object 2012 for displaying information related to the broadcast, or may reposition the setup menu object 2018.

That is, the user may set the type, size, and position of the objects displayed in the card object according to preference. Since the default home screen may be separately provided, the user can log in to the image display apparatus using the user account and utilize the image display apparatus using a custom screen configuration set by the user. Moreover, the user may have sole access and privacy of his account independent of other users who may also access the same image display apparatus.

The screen configurations of other card objects may also be changed. For example, the number of CPs displayed in the CP list 2025 of the card object 2020 may be decreased, such that only favorite CPs are displayed, and the size of individual CPs may be increased. Alternatively, the number applications objects displayed in the application list 2035 may be increased to a desired value such that the user can additional applications icons.

In FIG. 21, unlike FIG. 20, the objects of the application list 2035 may include objects in which the objects are partially displayed. The partially displayed objects may indicate to the user that hidden objects may be available off screen. The user can display the hidden objects by scrolling up within the card objects, for example, by using the remote controller.

Alternatively, if the partially displayed objects are selected, the objects hidden from the display 180 may be displayed without a separate scroll operation. Here, all the displayed objects may be replaced with the additionally available objects, only the selected row of hidden objects, or a predetermined number of rows of additional objects may be displayed to replace the displayed objects. That is, a user preference setting may be provided to customize the method in which objects are scrolled on an account basis.

Moreover, in the default home screen, the mandatory application items (search, TV Apps, '+') 2006, 2007 and 2009 may be configured such that it cannot be edited by the user. However, in the account-setting for a customized home screen, a mandatory application item (e.g., the mandatory application item 2007) may be deleted, as shown in FIG. 21.

FIG. 22 shows a screen image which illustrates a change in the type of the card objects displayed on the default home screen of FIG. 20. In FIG. 22, one of the card objects displayed on the home screen may be replaced. That is, the TV Apps card object 2030, as shown in FIG. 20, may be replaced with the favorite channel card object 2040. The favorite channel object 2019, which may be unnecessary when the favorite channel card object 2040 is displayed, may also be deleted.

If a favorite channel card object name 2042 is selected, it may be possible to find additional favorite channels for display from a channel selection window displayed in fullscreen. When a channel from the favorite channel list 2045 is selected, the selected channel may be displayed.

Figure 23A:
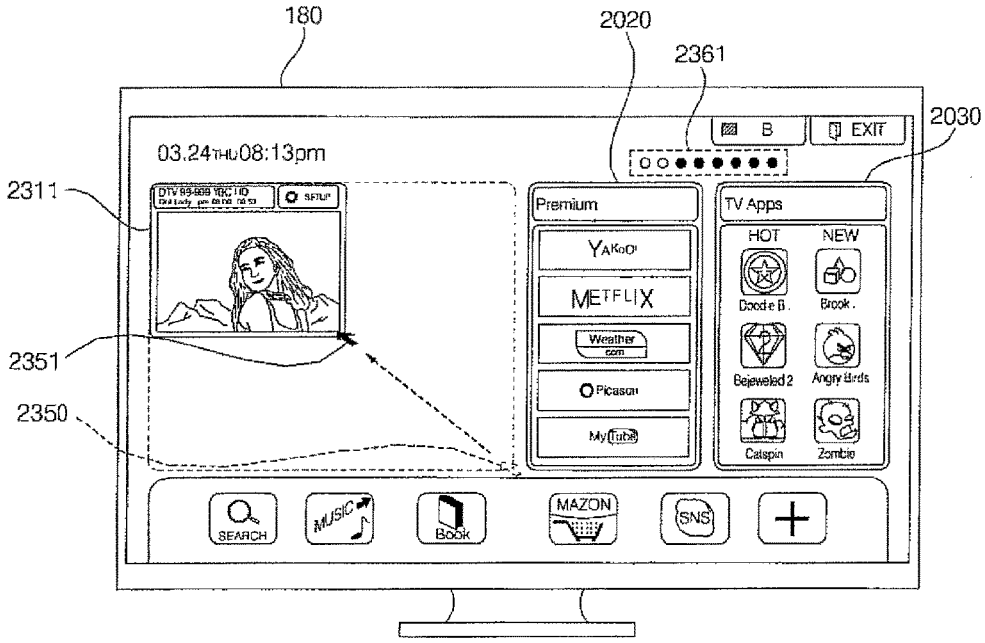
Figure 23B:
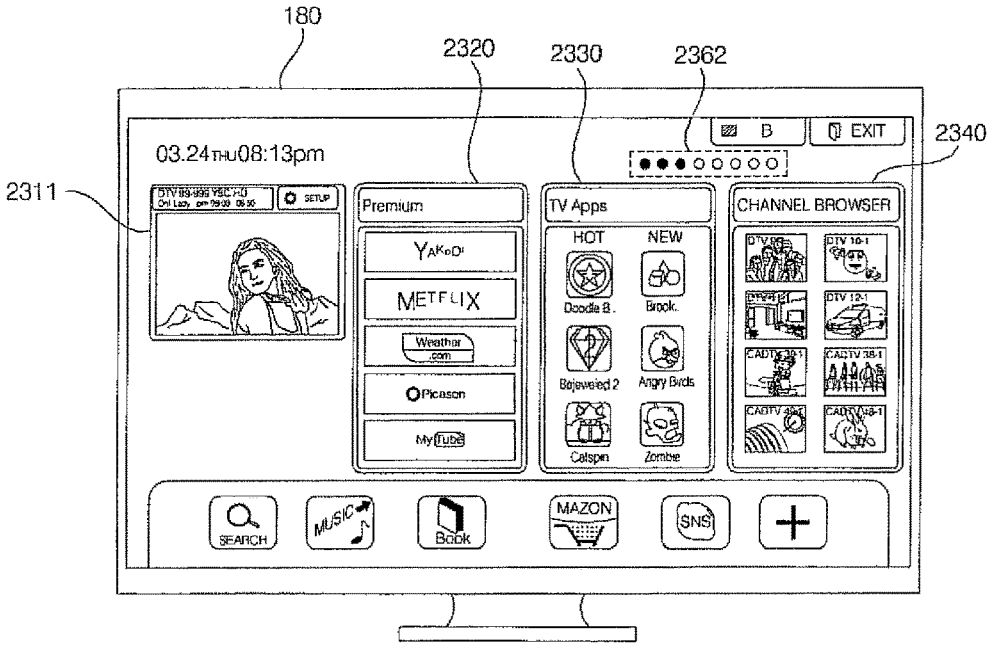

FIGS. 23A and 23B show screen images illustrating a change in the size of an object displayed on a screen or a configuration of an area on the screen by user manipulation. For example, while the broadcast image is being displayed or while another screen or another function of the image display apparatus is being used, the user may select a set up menu or request an edit mode using, for example, a hot key on the remote controller 200. Thereafter, an edit mode of the screen may be activated. The edit mode may include, for example, a default home screen which may be edited according to user inputs.

Referring to FIG. 23A, the size of the broadcast image card object 2311 may be changed by manipulation of the screen. For example, the pointer 2350 on the display 180 may be dragged such that the broadcast card object 2311 is scaled to a desired size. The broadcast image card object 2311 may be scaled up or down based on the position of the pointer 2351 to which it is dragged. By such scaling, as shown in FIG. 23B, an additional card object 2340 may be displayed to increase the number of card objects displayed on the display 180. That is, by scaling-up or scaling-down the site of the broadcast card object 2311, the number of other displayed card objects may be two or four, instead of three.

As shown in FIGS. 23A and 23B, the display states of indicators 2361 and 2362 representing the total number of card objects and the displayed card objects may be updated according to the change in the number of card objects displayed on the screen.

While a selection of a hot key is disclosed herein as launching a set up menu or an edit mode, this disclosure is not limited thereto. In certain embodiments, changes to the display configuration may be made during normal operation of the home screen. For example, resizing the card objects using the cursor or moving the location of a card object may automatically initiate the edit mode. Here, once the changes in layout is complete, a notification message may be displayed to the user to save the changes to the display configuration.

Figure 24:
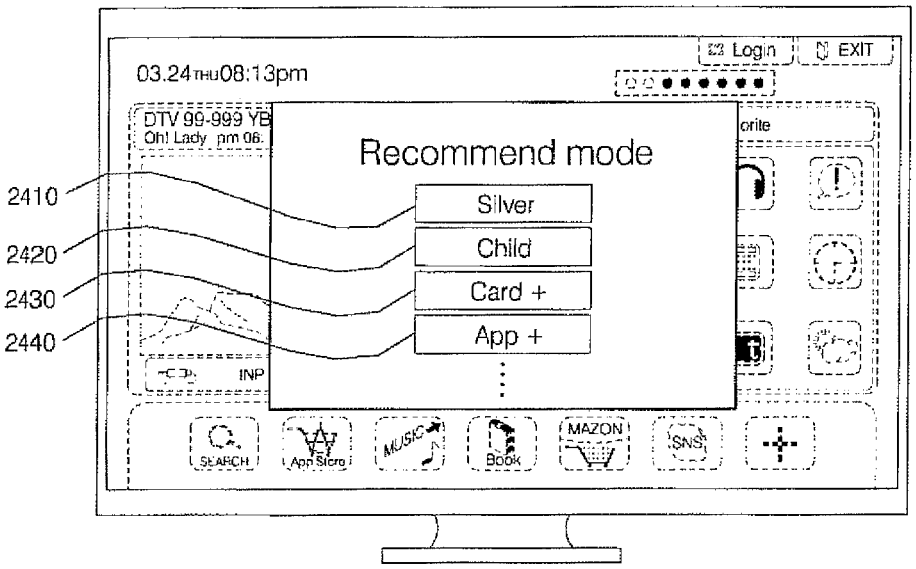
Figure 25:
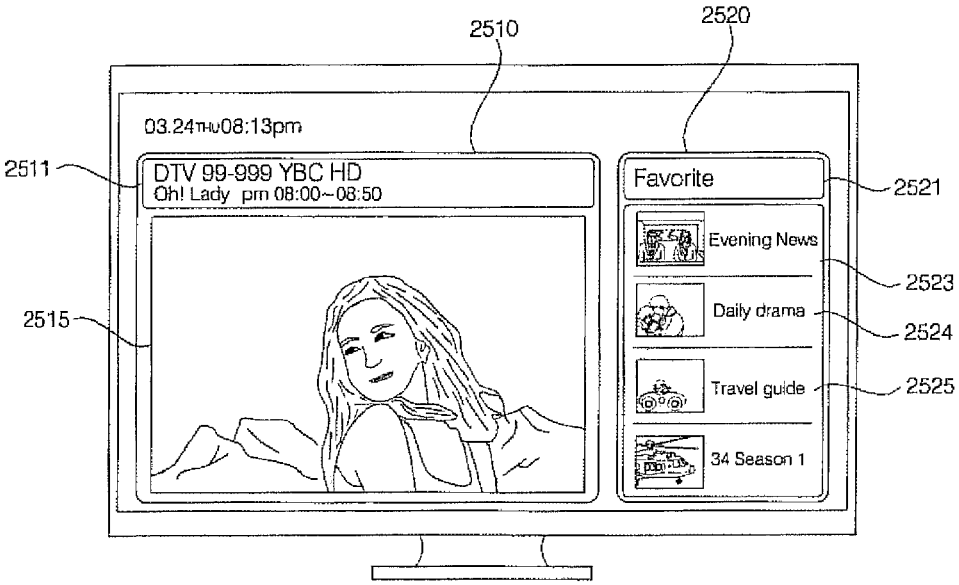
Figure 26:
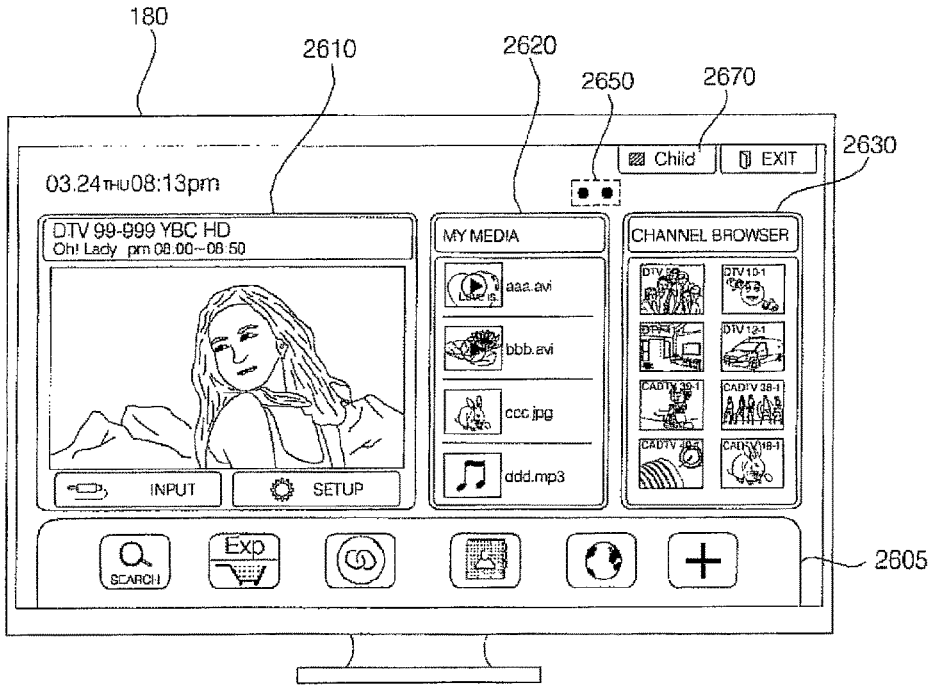

FIGS. 24 to 26 are screen images illustrating an operation of recommended screen modes according to an embodiment. This embodiment may include a step of displaying a plurality of recommended screen modes used to configure the screen configuration. The setting inputs may be a selection of one recommended mode from the plurality of recommended screen modes which are displayed.

That is, as described with reference to FIGS. 21 to 23, the user can individually and freely set the screen configuration according to his or her preference. For example, setting inputs may be manually entered or a default home screen may be displayed which may be configured as desired. In addition, the recommended screen modes may include preset sub-items associated with the screen configuration. The recommended screen mode selected by the user may be applied to the user's account.

As shown in FIG. 24, the recommended screen modes may include a "silver" mode 2410 for the elderly, a "child" mode 2420 for minors, a "card +" mode 2430 for displaying as many card objects as possible, an "APP +" mode 2440 for displaying as many applications as possible, or another appropriate type of predefined recommended screen modes. The recommended screen modes of FIG. 24 are only exemplary and the present disclosure is not limited thereto. As shown, when the recommended screen modes are displayed, the screen which was originally displayed may be displayed to be translucent, disappear, or become dark until a mode is selected.

FIG. 25 shows a home screen corresponding to the "silver" mode 2410. The environmental setting of the "silver" mode 2410 may include a configuration of screens other than the home screen. Here, since the elderly may have difficulty using complex functions of the image display apparatus, a simplified home screen configuration may be provided. The home screen of the "silver" mode 2410 may be configured to not display the application menu or supplementary card objects, and may instead display a simple screen. For example, as shown in FIG. 25, the home screen of the "silver" mode may include only a card object 2510 for displaying a broadcast image and a favorite channel card object 2520. Moreover, each of the card objects may be enlarged for easier viewing and selection.

If a broadcast image 2515 of the card object 2510 is selected, the broadcast image 2515 may be displayed on the display 180 in fullscreen. If the names 2511 and 2521 of the card objects are selected, the corresponding card object may be switched to the fullscreen view. Moreover, the number of favorite channel information 2523, 2524 and 2525 listed in the favorite channel card object 2520 in the "silver" mode may be minimized and the display sizes thereof may be maximized. Accordingly, the favorite channel information may be made easier to view.

FIG. 26 shows a home screen corresponding to the "child" mode 2420. The environmental setting of the "child" mode 2420 may include configuration of screens other than those displayed on the home screen. Parental controls may set to restrict access of the image display apparatus for children. For example, a child may not be able to enter or recall a user name and password. Hence, in this embodiment, a user may be identified by facial recognition or voice recognition as an alternative to an ID and password to authenticate the user. Accordingly, even when parents are not home, a login operation may be performed by a child using a "child" account and the environmental setting thereof may be automatically applied.

In the home screen of the "child" mode 2420, access to an unavailable card object may be disabled such that a displayed card object may not be moved or replaced. In the example of FIG. 26, the indicator 2650 representing the total number of displayable card objects may be reduced to have two dots corresponding to the My Media and Channel Browser card objects 2620, 2630.

In certain embodiments, the scrolling function for the card objects 2620, 2630 may be enabled to only display card objects authorized for viewing by the parental control settings. Here, the indicator 2650 may correspond to the available card objects, as disclosed in previous embodiments.

Moreover, the content and the channel information included in card objects 2620 and 2630 may include content that is suitable for minors. An application item displayed in the application menu 2605 may be preset. Additionally, information indicating the current mode of operation to be the "child" mode 2420 may be displayed in a login object 2670.

Figure 27:
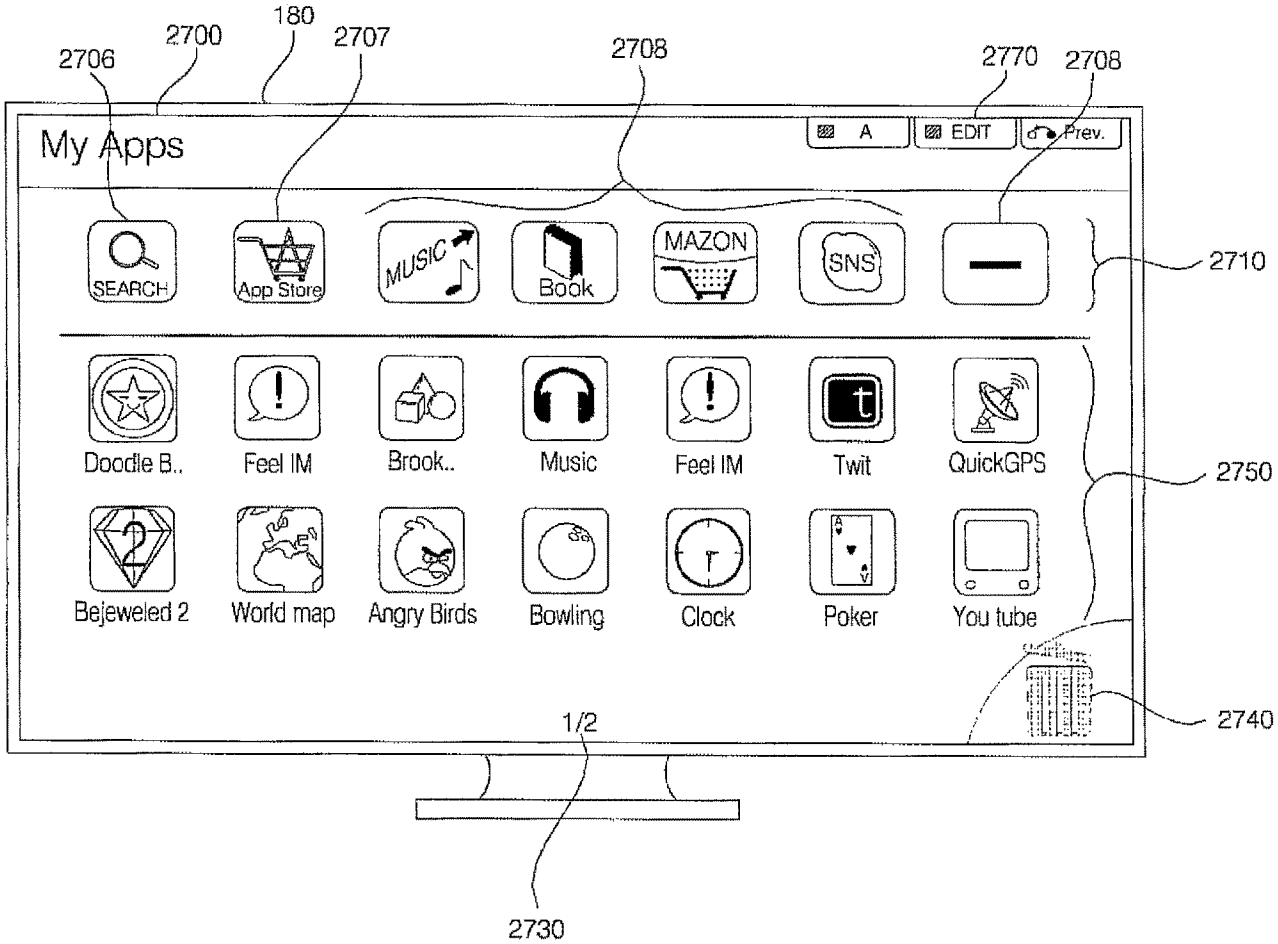
Figure 28:
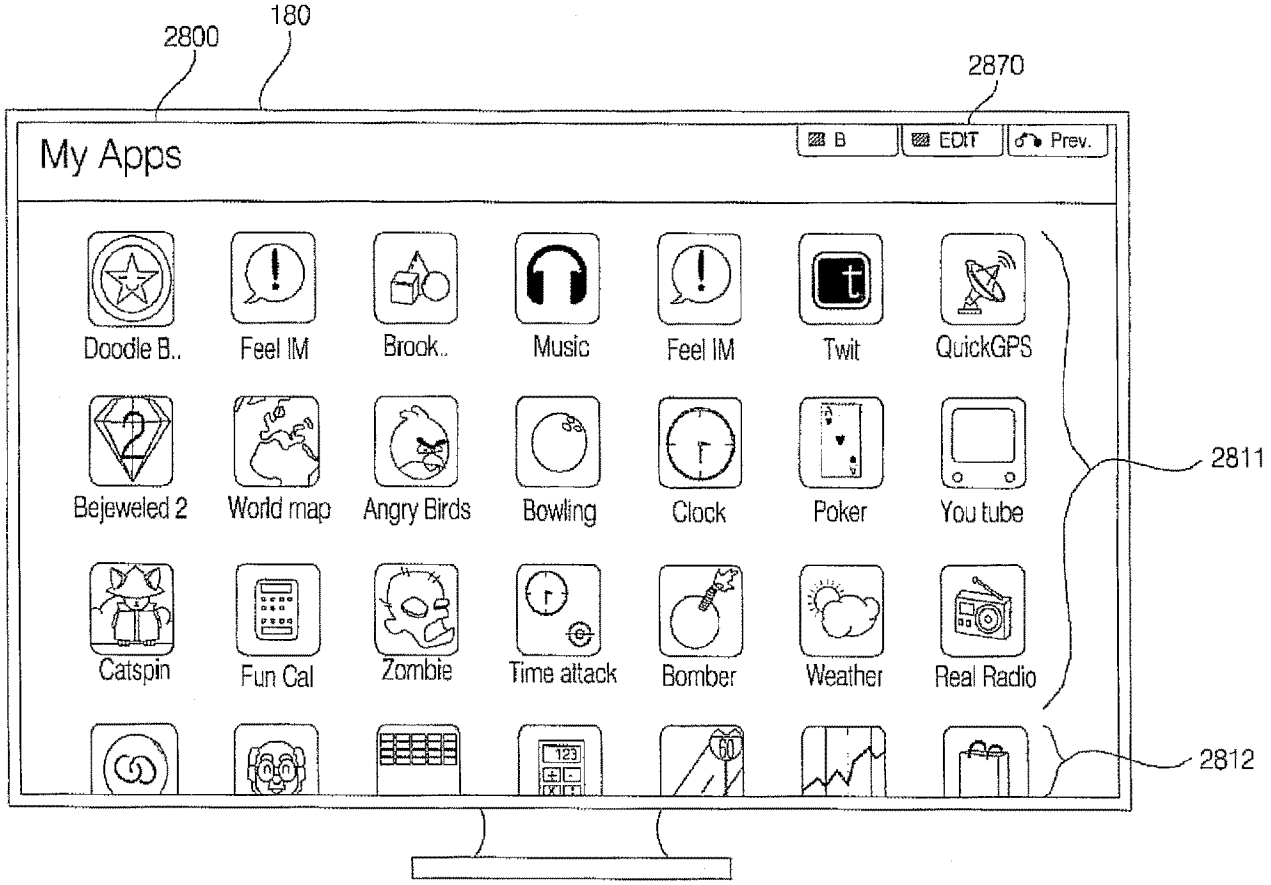

FIGS. 27 to 29 show screen images of application screens displayed in fullscreen views. A full screen view of all applications available on the image display apparatus may be accessed from the home screen 2000 by selecting the "+" icon 2009. The screen configuration information may include setting information for the configuration of this full screen view. The setting information may control the number, size, display method, and position of the application items (e.g., icons) displayed on one screen.

As shown in FIG. 27, the full-view application screen 2700 (My Apps Screen) may include a compact-view application menu 2710 corresponding to an application menu 2005 on a home screen and an extended application menu 2750 including additional application items. Each menu may include a plurality of application items.

The full-view screen 2700 may include at least one object 2740 (Trash Can) to delete an application item. An object 2730 representing the page number of the current screen a total number of screens may also be provided.

The items displayed in the compact-view application menu 2710 may be the same as those displayed in the application menu 2005 on the home screen 2000. Moreover, instead of a '+' (View More) application item displayed on the application menu 2005, a '−' (compact-view) application item 2709 may be displayed as a mandatory application item in the compact-view application menu 2710. A selection of the compact-view application item may return the display screen to the home screen 2000. That is, the application menu 2005 on the home screen 2000 may be displayed by activating the compact-view mode through the compact-view application item.

The extended application menu 2750 may include items hidden from the home screen 2000 among the application items available on the image display apparatus. Moreover, the edit button 2770 may be selected to edit the My Apps screen or to edit the application menus 2710, 2750. For example, the displayed icons in the extended application menu 2750 may be dragged into the compact-view application menu 2710 to edit the compact-view application menu 2710. The configuration of the My Apps screen 2700 may be changed as to a configuration as shown in FIGS. 28 and 29 as described hereinbelow.

The full-view screen 2700 may further include a trash can icon 2740 to delete an application item. For example, an application icon may be dragged into the trash can icon 2740 to be deleted. Moreover, a selection of the trash can icon 2740 may display a fullscreen image listing all objects which have been placed in the trash can 2740. The full-view screen 2700 may further include a page number object 2730 representing the page number of the displayed screen.

FIG. 28 shows a full-view application screen illustrating a screen configuration for another user account. In the full-view application screen 2800 (My Apps screen) of FIG. 28, the compact-view application menu 2710 is not displayed such that as many application items as possible may be displayed.

Moreover, the My Apps screen 2800 may include partially displayed application items 2812 in addition to application items 2811. The partially displayed application items 2812 may indicate a presence of at least one additional application item which may be available for display. When one of the partially displayed application items 2812 is selected, an additional row of icons or additional page of icons may be displayed.

For example, if the partially displayed application items 2812 are selected from the plurality of application items, the next page (or previous page if the partially displayed application items are displayed at the top of the page) of application items or icons may be displayed. The selection of the partially displayed icons 2812 may also scroll the icons by one row to display one new row of icons instead of a new page of icons. Moreover, the display of the partially displayed icon may be activated in the screen settings. The configuration of the partially displayed icons (e.g., scrolling options) may be set in the screen settings. Furthermore, the My Apps screen 2800 may be edited as previously disclosed with reference to FIG. 27, for example, by selecting the edit button 2870.

Figure 29A:
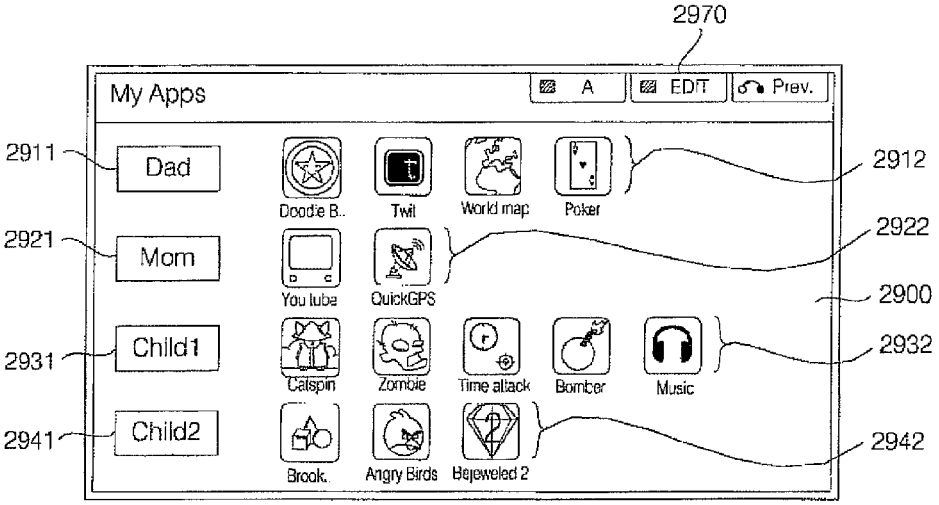
Figure 29B:
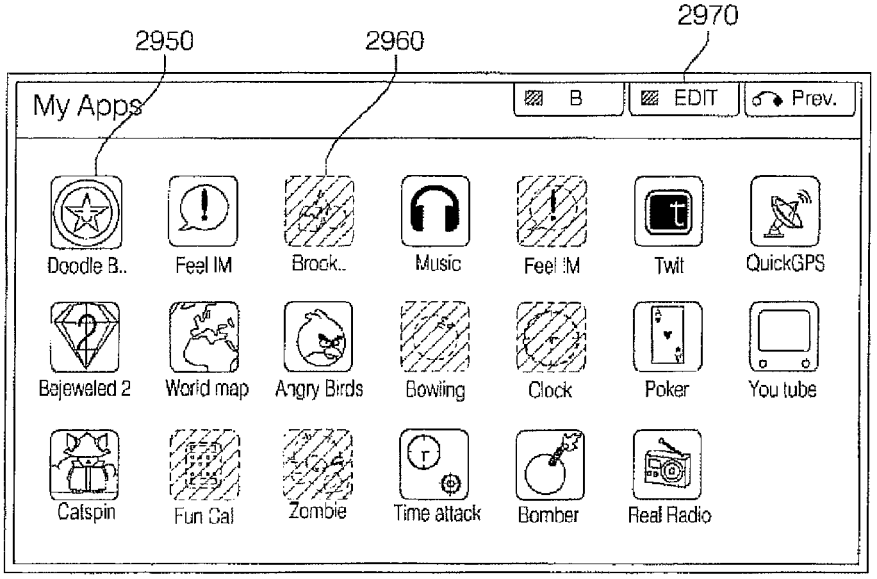
Figure 29C:
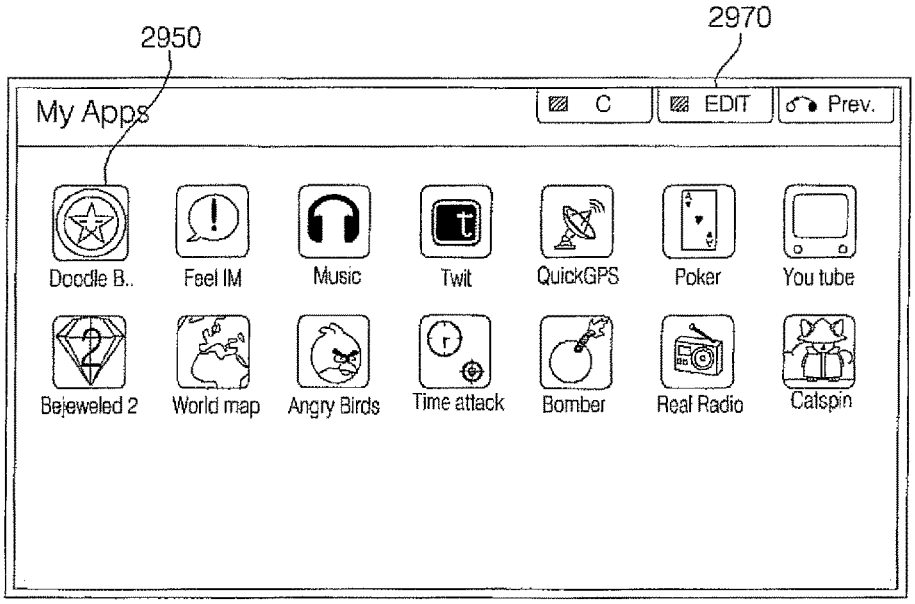

As shown in FIGS. 29A to 29C, it may be possible to sort or group the available application icons for display. The application icons may be grouped for display based on an account-based sorting to display application icons associated with all user accounts, a full-view based sorting to display application icons associated with a logged-in user account, an exclusive-view based sorting to display only active application icons associated with a logged-in user account, or a manual sorting to display individual application icons according to user input.

FIG. 29A shows a full-view application screen 2900 using an account-based sorting method. Here, accounts 2911, 2921, 2931 and 2941 are displayed and respective application icons 2912, 2922, 2932 and 2942 associated with the accounts may be sorted and displayed.

FIG. 29B shows a full-view screen image in which application icons 2950 for applications are displayed based on whether they are active or inactive. Here, application icons 2950 which are available to a logged-in user may be displayed in an active state and application icons 2960 for applications which are not available to the user may be displayed in an inactive state.

FIG. 29C shows an exclusive-view screen image in which only application icons 2950 for applications which are available to a logged-in user are displayed. Moreover, in the manual method, a logged-in user may directly select application icons for display/non-display and may manually configure the display order of the application icons. As previously described, the edit button 2970 may be selected to edit the layout or configuration of the My Apps screen of FIGS. 29A to 29C.

Figure 30:
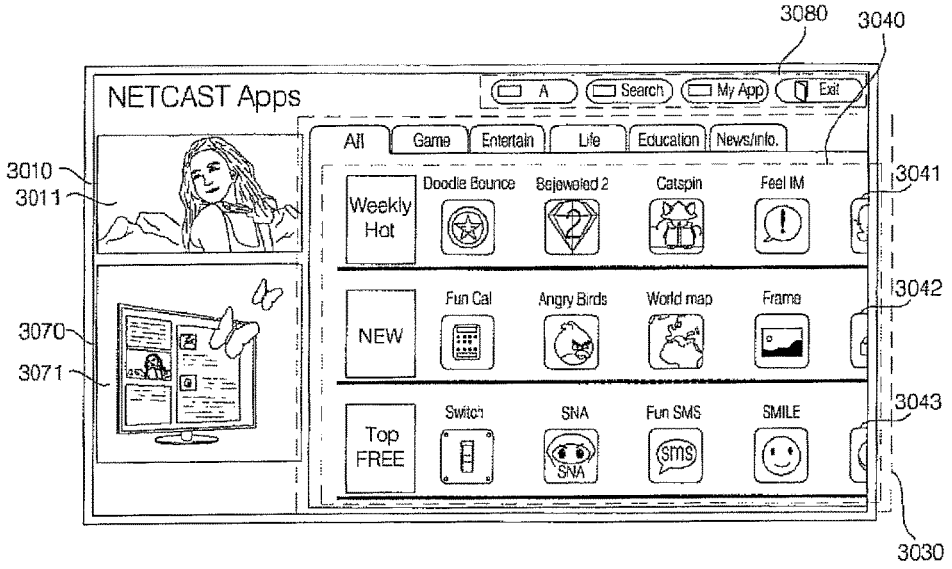
Figure 31:
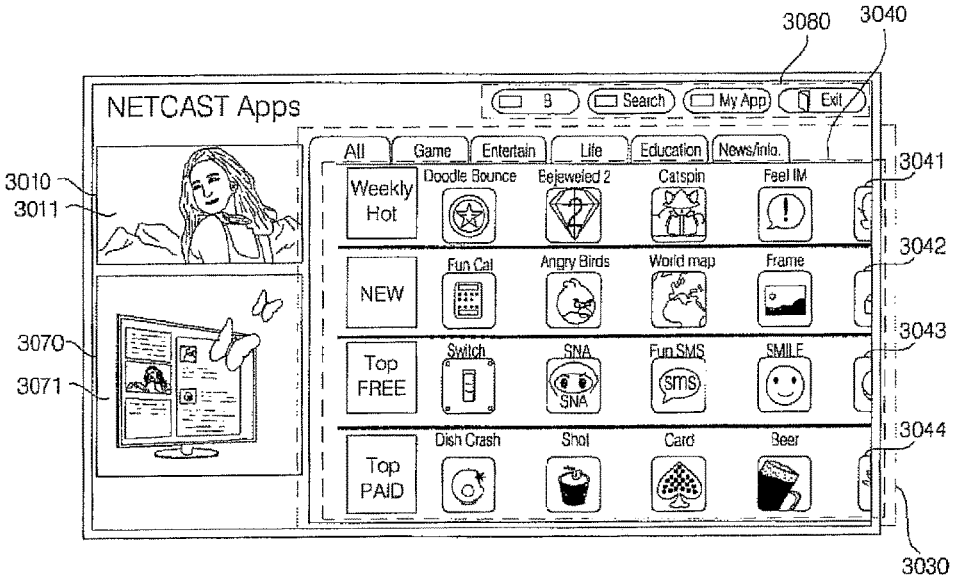

FIGS. 30 and 31 show App Store screens having different configurations. The App Store screen (NETCAST App screens) of FIG. 30 may correspond to a configuration associated with a user A. This App Store screen may include a tab menu having category items for classifying a plurality of applications in a first area 3030 of the display 180.

Since new applications may be continuously released and added to the App Store, the user may not be able to sufficiently obtain information about the new applications and may not be able to identify the new applications displayed on the screen. However, when the applications are provided to the user according to categories such as games, news, or sports, as shown in FIG. 30, the user may be able to keep track of the newly added applications and may be able to more easily find a desired application.

A broadcast image 3011 may be displayed in a second area 3010 of the display 180. Since the user can access the App Store while viewing the broadcast image 3011, it may be possible to search for and download an application while viewing content.

If a category item or tab is selected from the tab menu, icons for applications included in the selected category item may be sorted and displayed in at least a part of the display 180. That is, the application icons may be displayed in a first area 3040 and may be further categorized according to sub-items. That is, the applications included in the selected category items are further categorized according to a predetermined criteria and sorted and displayed according to sub-items (e.g., Weekly Hot NEW, Top FREE), thereby enabling the user to readily identify the applications.

In the App Store screen, as shown in FIG. 30, a category item "All" that includes all available applications is selected. The selected category item (active category item or tab) may be displayed differently from the other category items, for example, with a different color or size.

Moreover, the category item "All" may be set as a default category item. In this case, when accessing the App Store, as shown in FIG. 30, icons corresponding to applications included in the category item "All" may be automatically sorted and displayed on the screen according to sub-item categories.

The sub-items may include categories for a hot item selection based on a predetermined period of time, a new application category, or a top free category. That is, the predetermined period of time may be, for example, a day, a week, a month, a quarter of a year, a half of a year, and a year. This predetermined time period may be set separately for each sub-item category. The user may arbitrarily set the predetermined time period.

For example, a hot item list representing the rank or popularity of an application, which is most downloaded or installed among all applications, may be displayed in weekly units. Moreover, a top free list and a top paid list may include application icons sorted among all applications which can be downloaded without charge or with charge. The application icons in these lists may be displayed based on a ranking for the most downloaded or installed applications. Any time period may be set for the rankings including an infinite time period, e.g., no time period. Moreover, a predetermined time period set for the new application list, which may list new applications which are released within a predetermined time period, may be set to be different from that of the other sub-item lists.

The application list of each sub-item may include icons for each application. Moreover, the icons may be fully displayed or partially displayed as previously described. Referring again to FIG. 30, each sub-item list may include icons 3041 to 3043 which are partially displayed. These partially displayed icons 3041 to 3043 may indicate to the user that hidden icons are present. If a partially displayed icon 3041 to 3043 is selected, the application list 3040 may switch to a next page and the next page may be displayed. That is, some of the icons may have a function for switching or scrolling the displayed list to a previous or next list.

A predetermined image, for example, an advertisement, may be displayed in a portion of the display 180, that is, a third area 3070. The predetermined image, for example, the advertisement image 3071, may be received through a network or a connected external device. If an advertisement image is not received from over the network or an external device, an arbitrary image may be displayed. For example, an advertisement image of a manufacturer of the image display apparatus which may be pre-stored on the image display apparatus may be displayed.

If a user selects or focuses on (e.g., scrolls a cursor over the icon) a specific application, a screen corresponding to the specific application may be displayed in the third area 3070. If a user focuses on one of the icons, information about an application corresponding to the selected icon may be displayed in the third area 3070. Moreover, various menu objects may be displayed in a fourth area 3080. The fourth area 3080 may include an icon or button which may indicate the identity of the logged-in user, a search function, a link to the My Apps screen, or to exit the App Store screen.

The user may change the sizes and positions of the first to fourth areas 3030, 3010, 3070, and 3080 for an account and may configure the App Store screen according to a user's preference. For example, the user may set another list such as a top paid category list to be displayed on the screen, as shown in FIG. 31. Alternatively, the user may customize the categories (e.g., tabs) as well as the sub-categories within each category for display. The first screen displayed when the App Store screen is accessed may also be set based on the user preferences.

Figure 32:
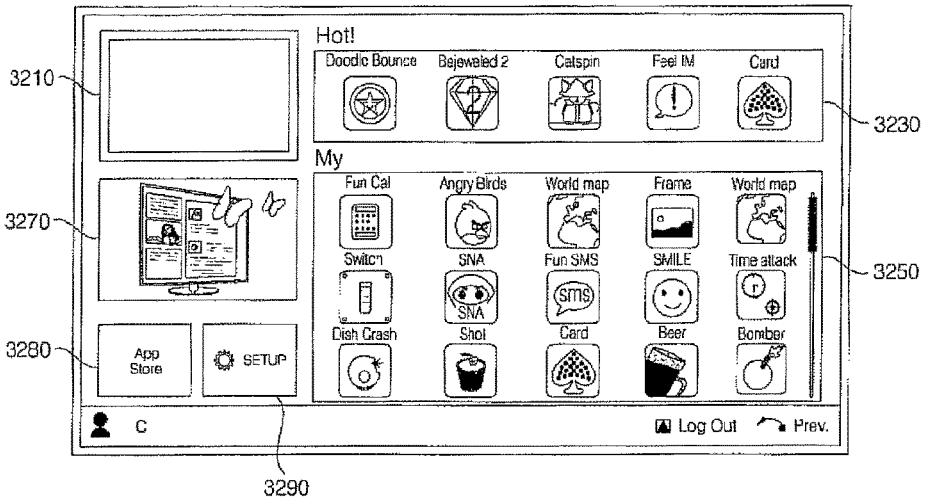

FIG. 32 shows an application screen that has a different configuration. Referring to FIG. 32, a broadcast image 3210 and an advertisement and information image 3270 may be displayed in one area. In addition, a hot application item 3230 and a My Apps list 3250 listing applications downloaded to the image display apparatus may be displayed in another area. In addition, a setup icon 3290 and an App Store icon 3280 may be arranged on the same screen. That is, as shown in FIG. 32, the user may customized his/her own screen configuration. Accordingly, it may be possible to customize various screen configurations on a user account basis. Hence, it may be possible to set a screen configuration according to a user preference and to readily obtain a variety of desired information. Thus, user convenience may be increased.

Figure 33:
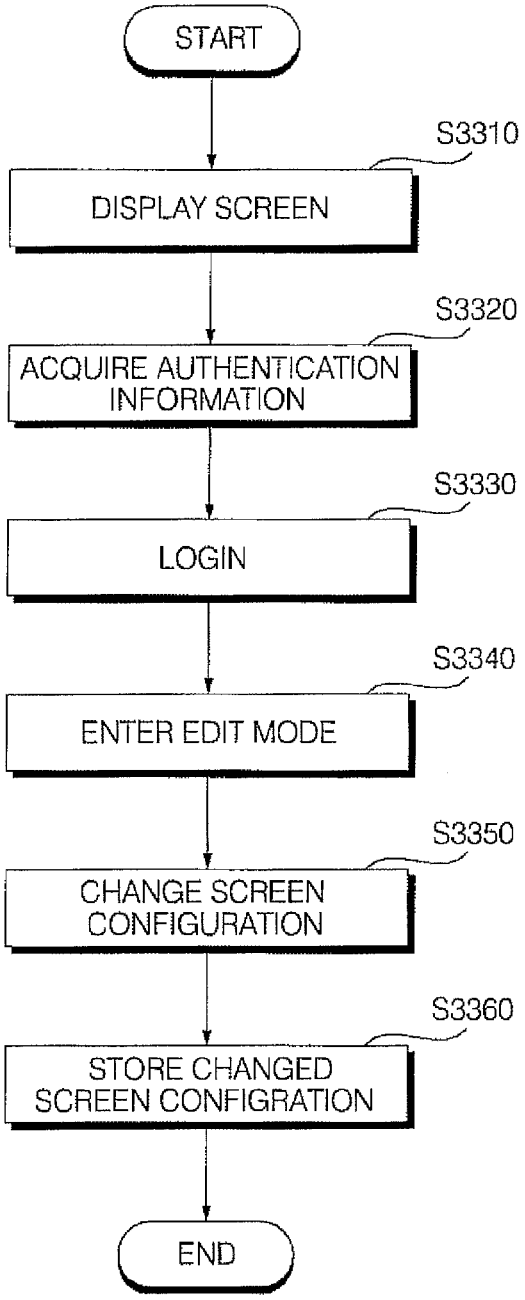
FIG. 33 is a flowchart of a method for operating an image display apparatus according to another embodiment.

FIG. 33 is a flowchart of a method for operating an image display apparatus according to an embodiment. Referring to FIG. 33, a predetermined screen may be displayed on the display 180, in step S3310. The predetermined screen may be a default home screen, a video image, or another appropriate display screen. Furthermore, the user account authentication information may be acquired, in step S3320, and a login operation may be performed using a user account based on the acquired user account authentication information, in step S3330.

The acquired user account authentication information may be a user ID and password which may be input by the user, user facial image photographed using a camera, or a user's voice input through an audio input device. The login operation may be performed by comparing the acquired user account authentication information (ID and password), facial recognition information, or voice information stored in the memory. That is, when the acquired authentication information is the same as the stored authentication information, the login may be successful.

Thereafter, an edit mode of the screen may be accessed, in step S3340, an input to change the screen configuration may be received, in step S3350, and the received screen configuration may be stored in the memory, in step S3360. In this embodiment, unlike the embodiments as described with reference to FIGS. 19 to 32, the edit mode for the displayed screen may be accessed immediately upon login to change the screen configuration.

If the user does not want a specific content or a function to be displayed, or wishes to otherwise customize the configuration of the screen, the user may do so immediately after login. For example, a default home screen may be displayed based on default settings which may then be modified to customize the home screen. Accordingly, at this time, the user may set the screen configuration as desired after entering the edit mode of the screen. The screens may be edited in a similar manner as previously described with reference to FIGS. 19 to 32.

In one embodiment, a step of displaying a plurality of recommended screen configurations of the screen may be included. The input for changing the screen configuration may be an selection of one from among the plurality of recommended display modes. That is, the recommended screen configurations may be provided in the edit mode, a selection command may be received from the user, and the selected screen configuration may be stored and applied to the user account.

The input to change the screen configuration may be an input to change the number, type, or position of the areas of the screen or an input to change the number, type, size, and position of the objects displayed in each area. In addition, the input to change the screen configuration may be an input to change a sort order or a method of displaying objects included in the screen. That is, similar to the embodiments described with reference to FIGS. 19 to 32, the number, type, position, sort order, and/or method of displaying the areas or the objects displayed in the areas of the screen may be changed. After the screen configuration has been changed or customized, the customized screen may be displayed on the display 180.

Figure 34:
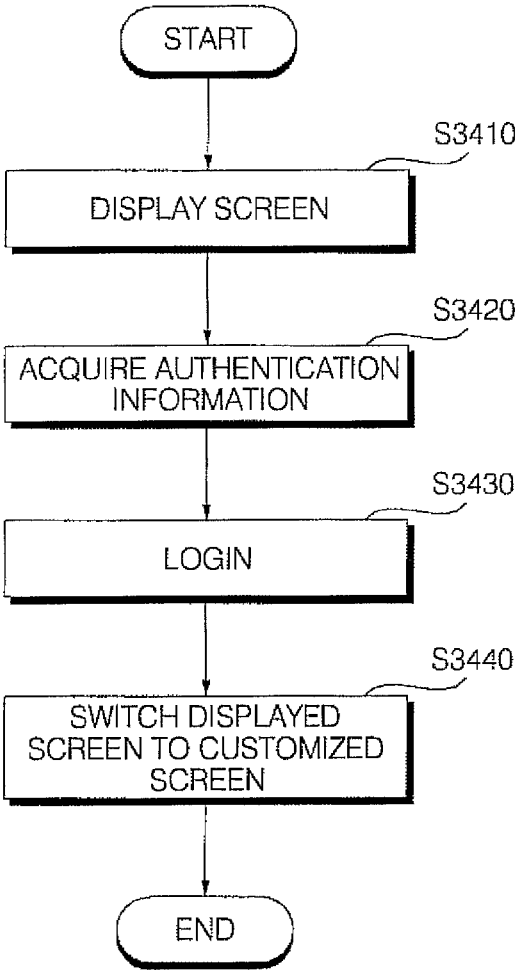
FIG. 34 is a flowchart of a method for operating an image display apparatus according to an embodiment.

FIG. 34 is a flowchart of a method for operating an image display apparatus according to an embodiment. The method may include displaying a screen, in step S3410. Here, the screen displayed may be a default home screen, a video image, or another display screen. The method may also include acquiring user account authentication information, in step S3420, performing a login operation to a user account based on the acquired user account authentication information, in step S3430, and switching the screen to a customized screen associated with the user account and having the environmental settings as set by the user, and switching the display to the customized screen, in step S3440.

That is, as described above, various screen configurations may be stored on an account basis. When a login operation is performed using a specific user account, the screen may be switched to a screen corresponding to the screen configuration of the specific user account and the switched screen may be displayed.

In this embodiment, it may be possible to set various screen configurations on a user account basis. Accordingly, it may be possible to set a screen configuration as desired and to readily obtain a variety of information. Thus, user convenience may be increased.

Figure 35:
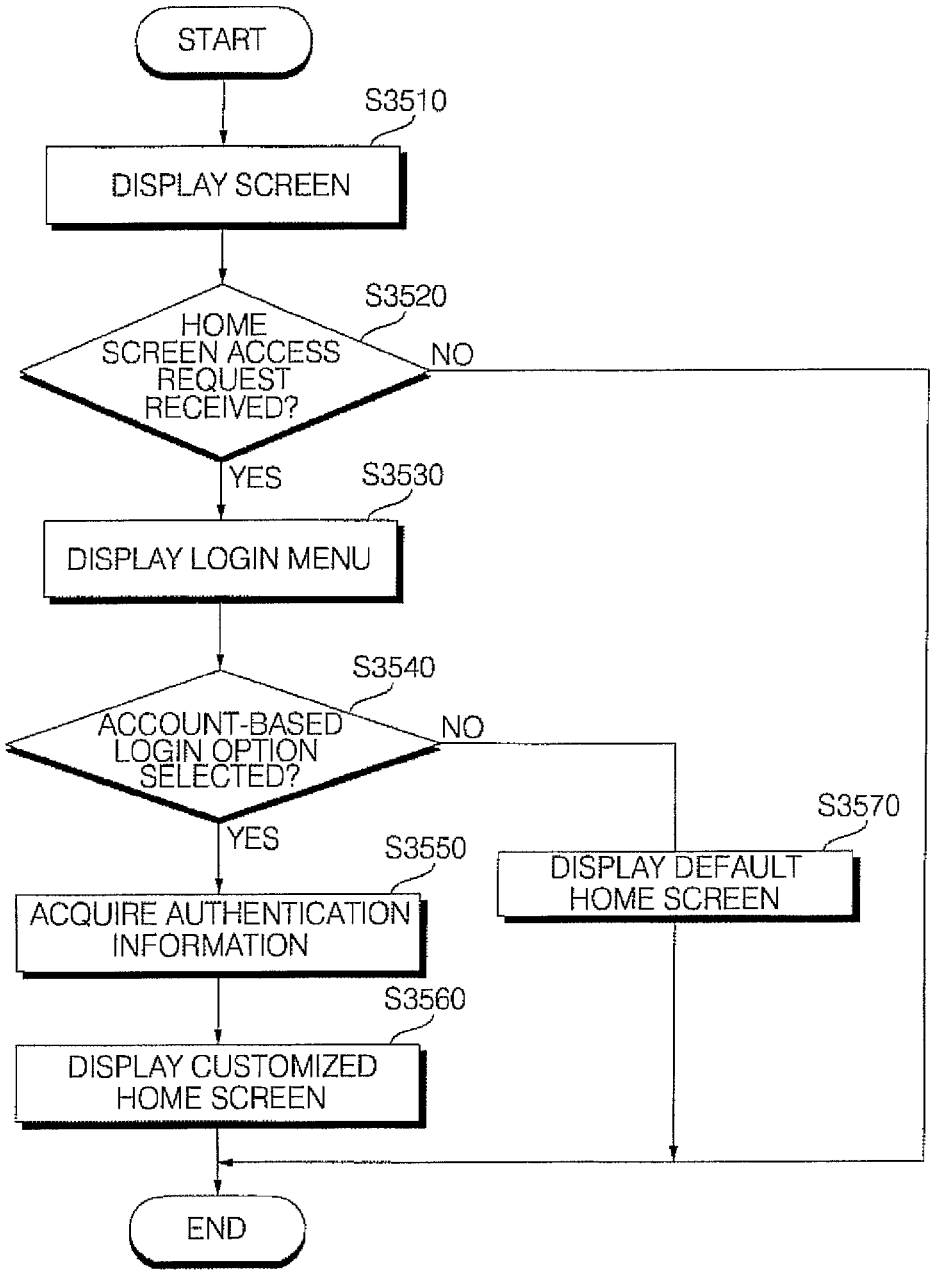
FIG. 35 is a flowchart of a method for displaying a home screen using a screen configuration set on a user account basis.
Figure 36A:
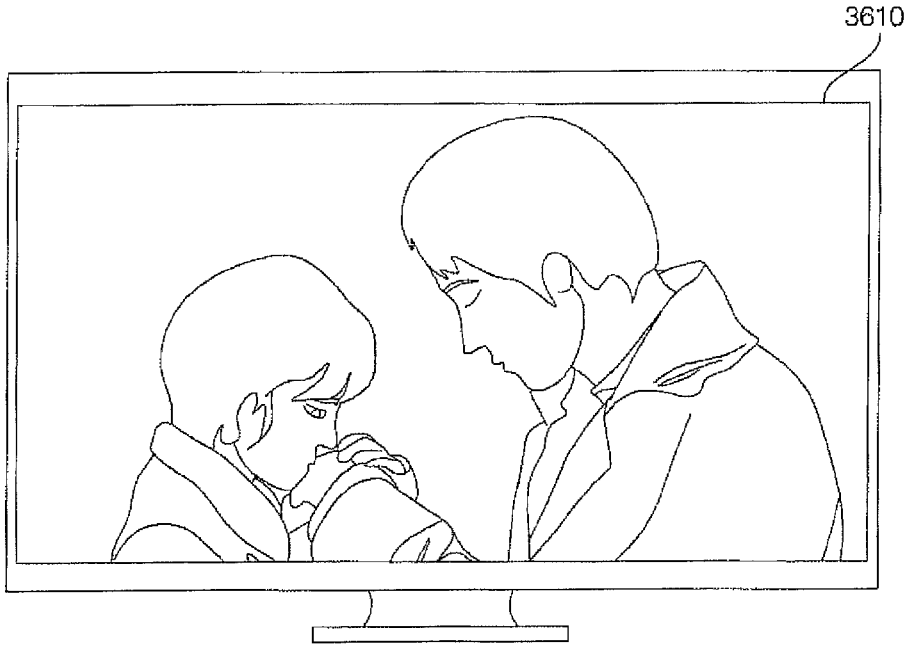
FIGS. 36A to 37C are show screen images to illustrate the method of FIG. 35.
Figure 36B:
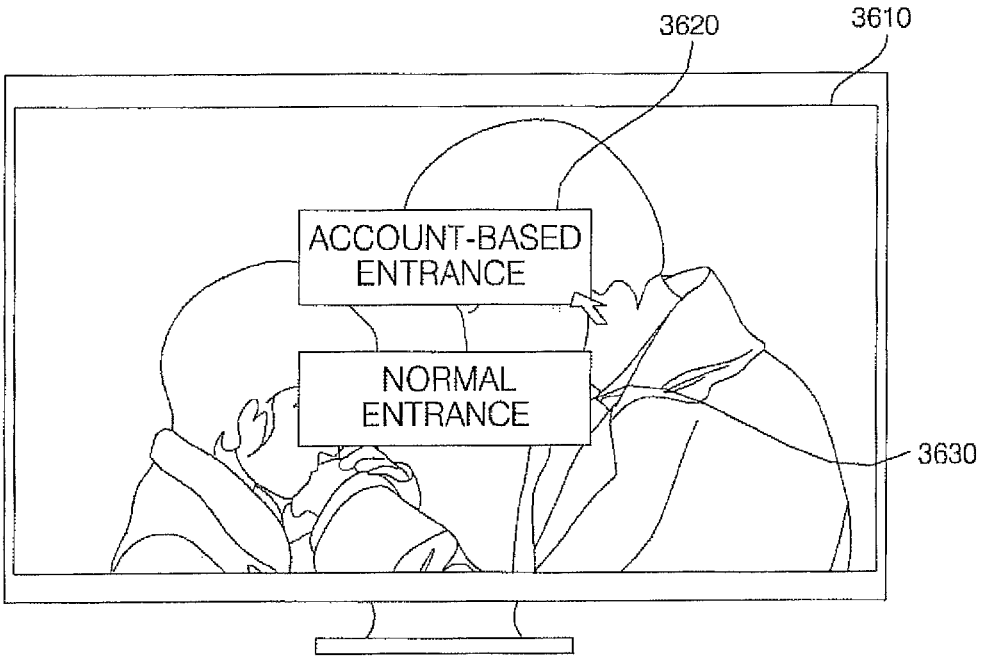

FIG. 35 is a flowchart of a method for displaying a home screen using a screen configuration set on a user account basis. FIGS. 36a, 36b, and 37 show screen images to illustrate the method of FIG. 35.

First, as shown in FIG. 36A, the user may view a broadcast image (video image) based on a signal received through the tuner 110, the network interface 130, or the external device interface 135 on the display 180 in fullscreen, in step S3510. While the broadcast image 3610 is viewed, or while another screen or another function of the image display apparatus is being used, the user may request to display a home screen to access various contents, such as applications or other multi-media content. The home screen may be a default home screen or a user specific home screen. The home screen may be accessed by selecting a home key of the remote controller or a smart home screen login hot key in order to access the applications or other content.

If a request to access the home screen is received, in step S3520, the controller 170 may control the display 180 to display a login menu, in step S3530. The login menu may include an account-based login menu option 3620 (e.g., user login) and a normal login menu option 3630 (e.g., guest login), as shown in FIG. 36B. The user login option may allow access to a user customized home screen while the guest login option may display a default (or normal) home screen.

Figure 36C:
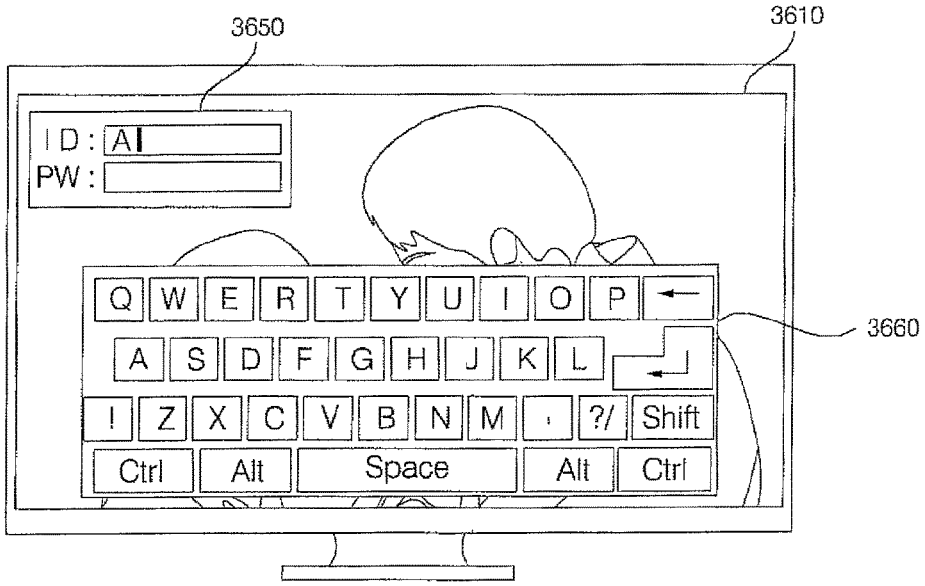
Figure 36D:
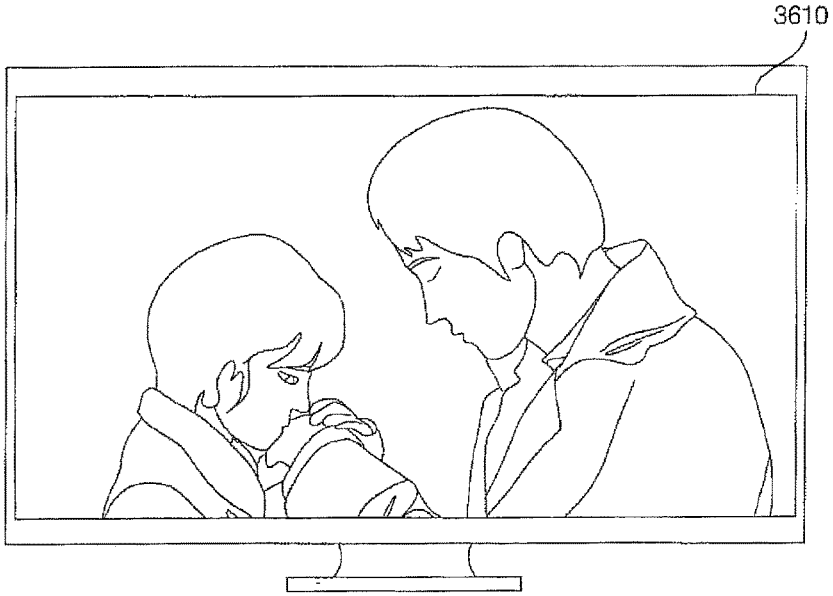
Figure 36E:
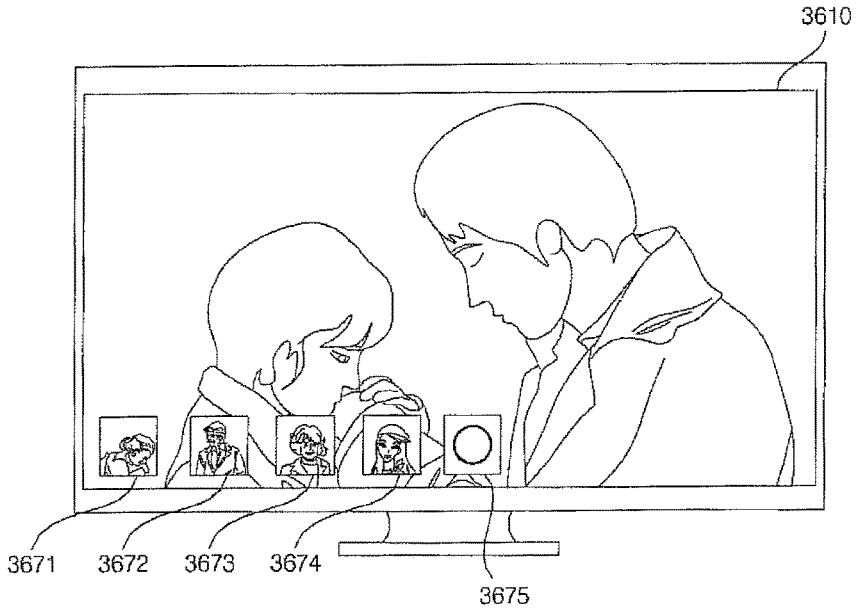
Figure 36F:
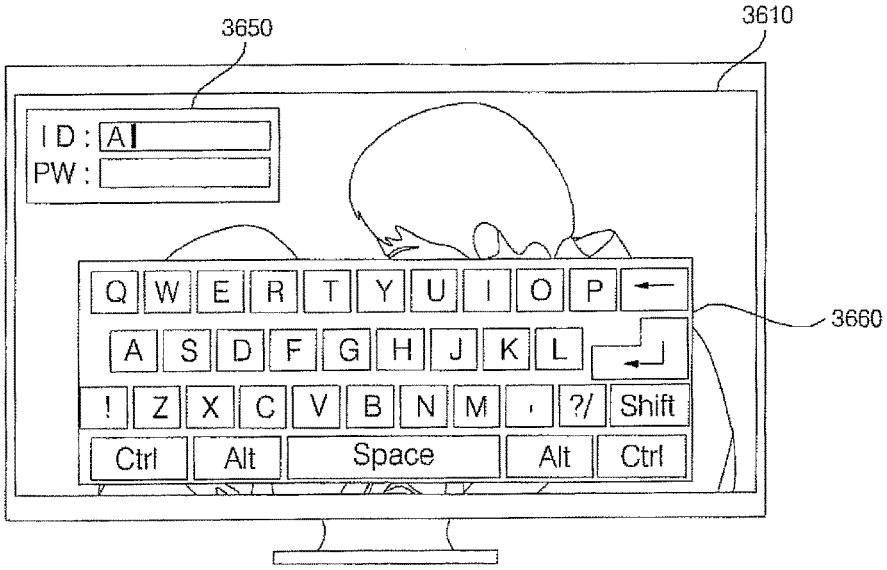

In another embodiment, as shown in FIGS. 36D-36F, if is a home screen access request is received, in step S3520, user account icons 3671, 3672, 3673, 3674 to access home screens corresponding to the user accounts or a guest icon 3675 (normal access icon) to access a default home screen may be displayed. In other words, in this embodiment, the user account icons 3671, 3672, 3673, 3674 and the guest icon 3675 may replace the login menu 3620, 3630 of FIG. 36B. The user account icon 3671, 3672, 3673, 3674 may include an image that identifies the user as designated by the user. For example, the image may include an image of the user, a name of the user, or another appropriate type of identifying information as set by the user.

The controller 170 may control the transparency of the user login menu option 3620 and the guest login menu option 3630. That is, in order to enable the user to continue viewing the image 3610 while the menus options 3620, 3630 are displayed, the user login menu option 3620 and the guest login menu option 3630 may be displayed to be translucent or the transparency thereof may be gradually increased.

Thereafter, the user may select either the user login menu option 3620 or the guest login menu option 3630, in step S3540. For example, the user may move a pointer 3640 which may be controlled by a movement of the remote controller 200 to select a menu option.

If the user login menu option 3620 is selected, the user account authentication information may be acquired, in step S3550. The acquired authentication information may be user ID and a password input by the user. This information may be entered using an input device such as a remote controller 200 or an on-screen keyboard if a touch screen display is provided. Alternatively, the acquired authentication information may be based on facial recognition or voice recognition.

FIG. 36C shows a login screen including an ID and password input window 3650 and an on-screen keyboard 3660 for inputting the authentication information. That is, if the password information is used as user account authentication information, a step of displaying an object for inputting a password on the display 180 may be further included.

The controller 170 may control the display position, display size and transparency of the ID and password input window 3650 and the on-screen keyboard 3660 such that the user may continue to view the image 3610 until the login operation is completed. Thereafter, a home screen corresponding to the logged-in user account may be displayed, in step S3560.

As previously described with reference to FIGS. 36D-36F, the login screen including the user ID and password window 3650 and the on-screen keyboard may be displayed in response to a selection of a user icon 3671-3674. Here, the user ID field may be automatically populated. Moreover, a selection of the guest icon 3675 may immediately display the default home screen without displaying the login screen.

Figure 37A:
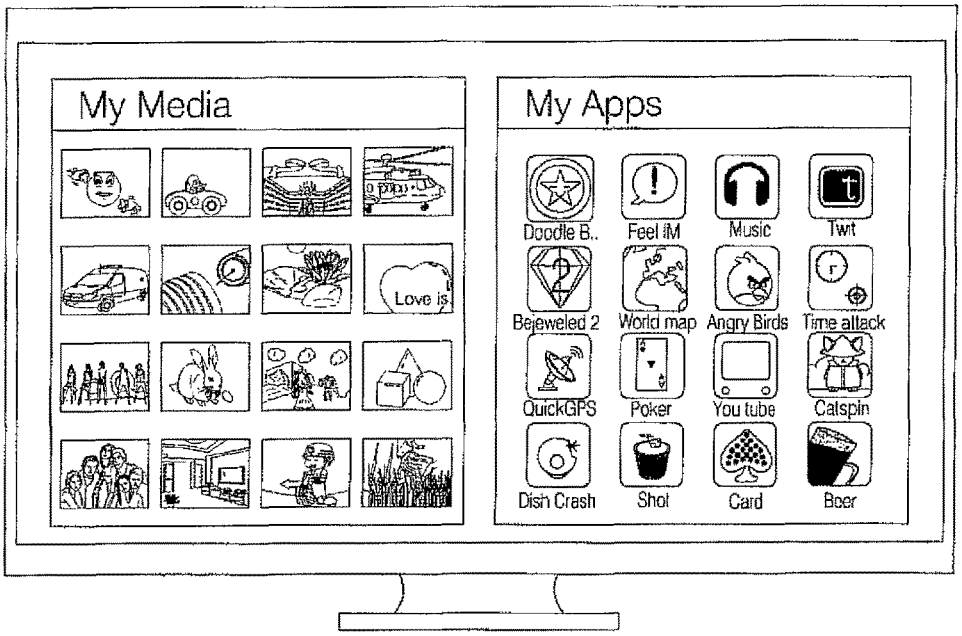
Figure 37B:
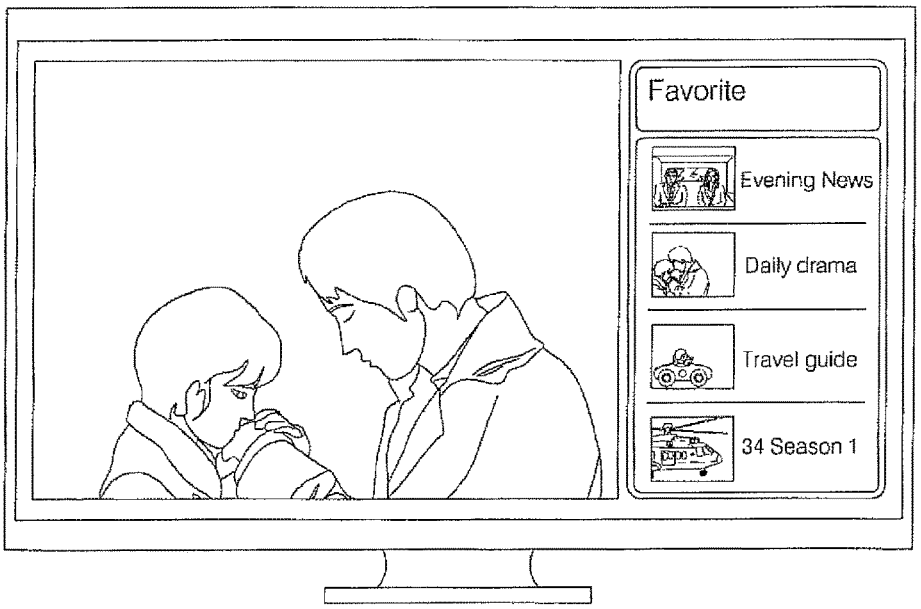
Figure 37C:
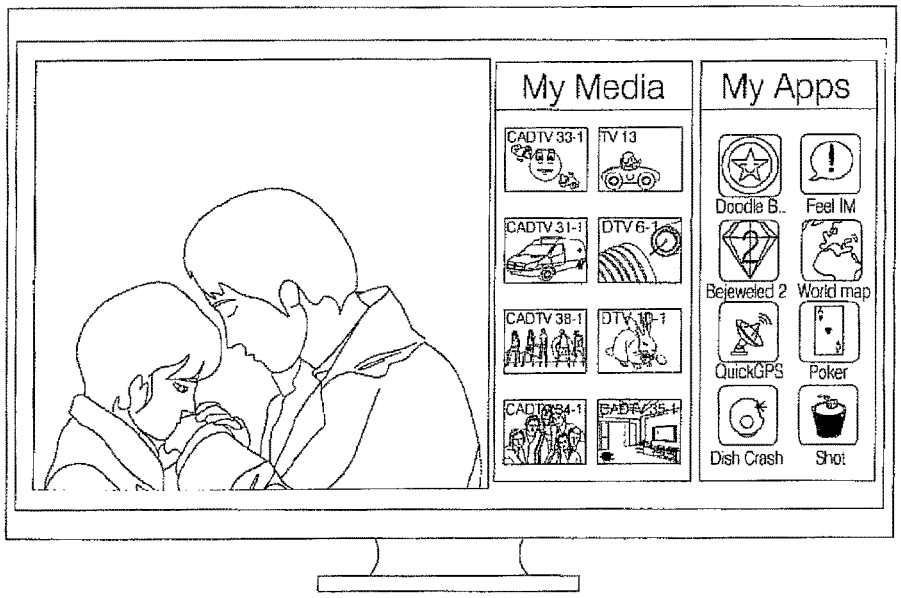

FIGS. 37A-37C show various home screens which may be associated with a user account, e.g., customized home screens. FIG. 37A shows a home screen including only content stored by the user (My Media) and applications downloaded by the user (My Apps) as customized for a user account. That is, the user who wishes to use individual content and applications may set a home screen that displays as many My Media and My Apps as possible, without displaying other objects.

FIG. 37B shows a home screen including a broadcast image, based on a signal received through the tuner 110, the network interface 130, or the external device interface 135, and a Favorite card object. The Favorite card object may list broadcast content (e.g., a channel or a link to a particular show) as designated by a user. If any one item is selected from the favorite list, content corresponding to the selected item may be played back on the display 180, a channel may be switched to a channel corresponding to the selected item, or a service corresponding to the selected item may be accessed.

FIG. 37C shows a home screen including a broadcast image based on a signal received through the tuner 110, the network interface 130, or the external device interface 135, content stored by the user (My Media), and applications downloaded by the user (My Apps) as set in a user account.

Figure 38:
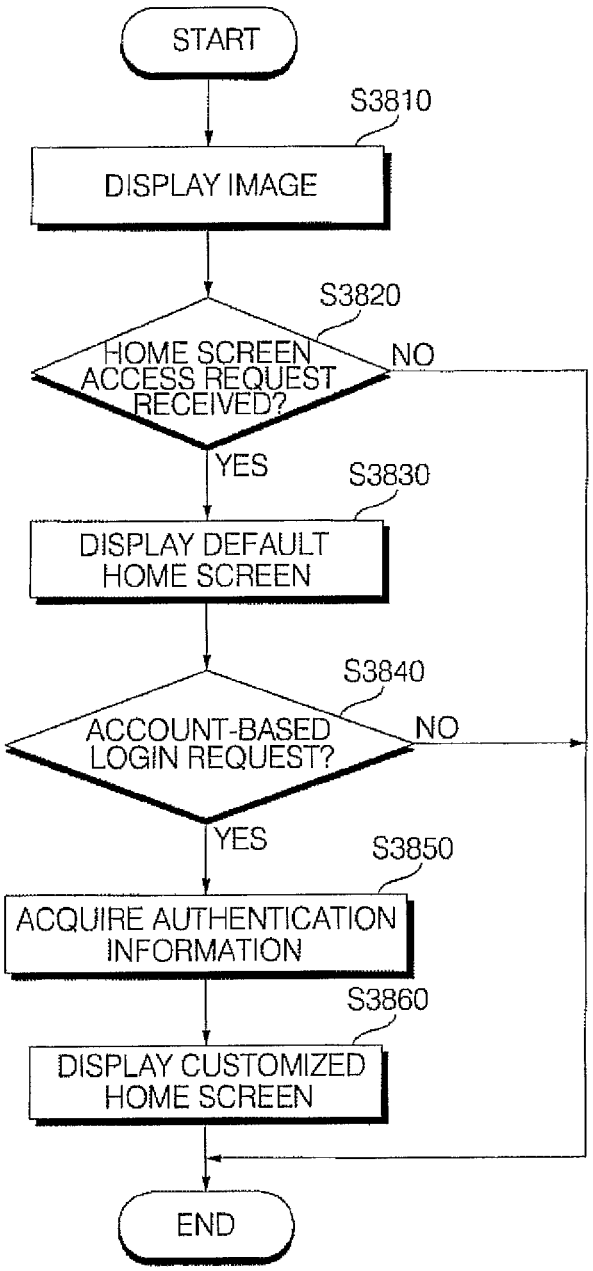
FIG. 38 is a flowchart of a method for displaying a home screen using a configuration set on a user account basis according to another embodiment.
Figure 39A:
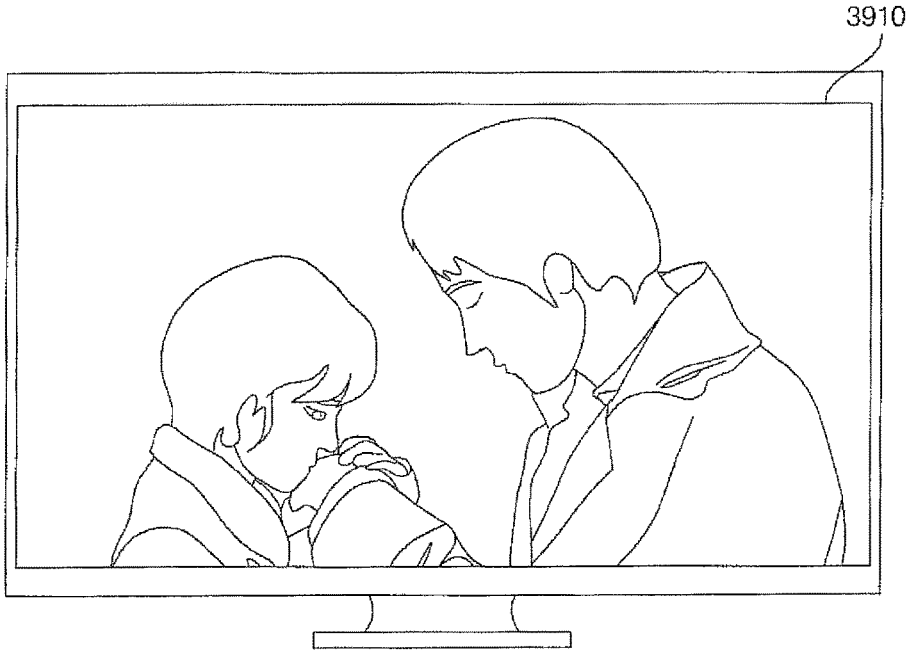
FIG. 39 shows screen images to illustrate the method of FIG. 38.
Figure 39B:
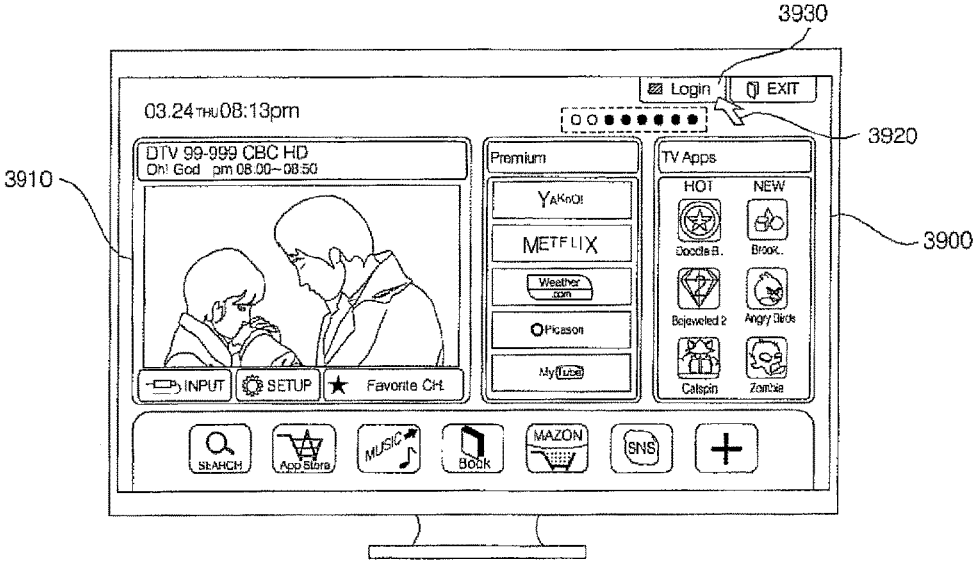
Figure 39C:
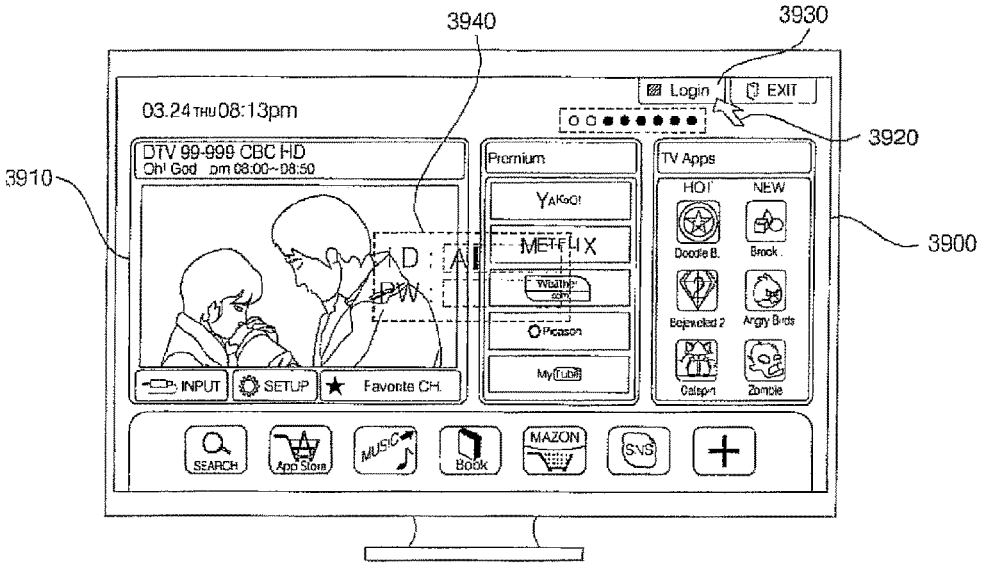

FIG. 38 is a flowchart of a method for displaying a home screen using the screen configuration set on a user account basis according to another embodiment. FIG. 39 shows a screen image to illustrate the method of FIG. 38. Referring to FIGS. 38 and 39, an image, for example, the broadcast image 3610 based on the signal received through the tuner 110, the network interface 130, or the external device interface 135 or an image corresponding to another function of the display apparatus is displayed on the display 180 in fullscreen, in step S3810. The user may request to access a home screen, in step S3820. Then, the controller 170 may control the display 180 to display a default home screen configured based on pre-stored default settings, in step S3830, as shown in FIG. 39B.

Then, the user may select the user login icon 3930, in step S3840. For example, the user may select the login icon 3930 using the pointer 3940 to login to a user account. Here, if correct authentication information is input in an ID and password input window 3940 or correct facial or voice recognition information is acquired, the user may be logged into the user account based on the acquired authentication information, in step S3850. A home screen associated with the account may then be displayed, in step S3860, as previously described. Moreover, the display position, the display size, and the transparency of the ID and password input window 3940 may be changed.

In this embodiment, it may be possible to set various screen configurations on a user account basis. Accordingly, it may be possible to set a screen configuration according to a user preference and to allow customization of the screen images. Thus, user convenience may be increased.

In one embodiment, a method of controlling a display on a multifunctional display device may include displaying a video on the display received through a channel of a broadcast signal tuned by a tuner or over a network; configuring a first and second multifunctional menu screens to include at least one of a first card object configured to display a scaled image of the video, a second card object that includes at least one link to tune to one or more channels of the broadcast signal or the network, or a third card object that includes at least one link for connecting to a content provider or to a storage device, wherein the first multifunctional menu screen is configured to be different than the second multifunctional menu screen; and displaying the first or second multifunctional menu screen in response to a login request to a corresponding user account, wherein the first multifunctional menu screen is associated with a first user account and the second multifunctional menu screen is associated with a second user account.

Here, the configuring may include changing a layout of the first or second multifunctional menu screen, wherein the changing the layout includes positioning the at least one card object in an area of the display or resizing the at least one card objects. Moreover, the configuring may include changing a content of at least one of the card objects or the configuring the first or second multifunctional menu screen may include configuring based on parental control settings. The configuring may also include selecting the at least one of the card objects from a plurality of types of card objects.

In this embodiment, the method may further include storing the configured multifunctional menu screen to correspond to the associated user account. Moreover, the displaying the first multifunctional menu screen may include receiving a request to display a multifunctional menu screen; creating the first user account; displaying an edit mode that includes a default multifunctional menu screen based on default preference settings; receiving inputs to edit a display configuration of the default multifunctional menu screen; storing the edited configuration to correspond to the first user account; and displaying the edited multifunctional menu screen.

The displaying the first or second multifunctional menus screen in response to the login request may include acquiring a first or second user authentication information corresponding to the respective user account. The user authentication information may also include at least one of a user ID and password, a voice recognition information, or a facial recognition information. The displaying the first or second multifunctional menu screen in response to the login request may include displaying a plurality of icons corresponding to a plurality of user accounts, and receiving a selection of one of the plurality of icons. The login request may be an input generated by a motion sensing remote controller. Moreover, the login request may be generated in response to a selection of a prescribed button on the motion sensing remote controller or a selection of an icon displayed on the display using a cursor controlled by a motion sensing remote controller.

Moreover, the first multifunctional menu screen may be a default menu screen. The default menu screen may include a login icon for logging in to a different account, wherein logging into the different account changes the displayed multifunctional menu screen. Furthermore, the configuring the first and second multifunctional menu screens may include configuring the first and second multifunctional menu screens based on one of a plurality of predefined configurations. The configuring the first and second multifunctional menu screens may also include selecting at least one category of content for display, wherein the at least one category may be provided by the content provider over the network.

In one embodiment, a method of controlling a display on a multifunctional display device may include displaying a video on the display received through a channel of a broadcast signal tuned by a tuner or over a network; receiving a request to display a menu screen to access content available on the multifunctional display device, wherein the menu screen includes at least one of a first card object configured to display a scaled image of the video, a second card object that includes at least one link to tune to one or more channels of the broadcast signal or the network, or a third card object that includes at least one link for connecting to a content provider or to a storage device; displaying a login screen to receive authentication information for a user account; authenticating the user based on the authentication information; determining whether the user account includes a customized menu screen, and creating the customized menu screen if the user account does not include the customized menu screen; and displaying the customized menu screen associated with the user account.

In one embodiment, a multifunctional display apparatus include a tuner configured to tune to a channel of a broadcast signal; a network interface configured to receive data packets; a display module; a wireless input interface to receive signals from a remote controller, a storage device to store display screen image configurations; and a processor configured to control the display module based on a signal from the remote controller. In this multifunctional display apparatus, a video received through the channel of the broadcast signal tuned by the tuner or over the network may be displayed on the display module, a first multifunctional menu screen may be displayed on the display module, wherein the first multifunctional menu screens includes at least one of a first card object displayed in a first area of the display module configured to display a scaled image of the video, a second card object displayed in a second area of the display module that includes at least one link to tune to a channel of a broadcast signal or a network, or a third card object that includes at least one link for connecting to a content provider or to a storage device, and a configuration of at least one of a layout or content of the card objects in the first multifunctional menu screen may be changed and the changed configuration may be stored to correspond to a user account stored on the multifunctional display apparatus.

The method for operating an image display apparatus according to the foregoing exemplary embodiments may be implemented as code that can be written on a computer-readable recording medium and can thus be read by a processor. The computer-readable recording medium may be any type of recording device in which data is stored in a computer-readable manner. Examples of the computer-readable recording medium may include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a display on a multifunctional display device, comprising:

displaying a video on the display received through a channel of a broadcast signal tuned by a tuner or over a network;

configuring a first and second multifunctional menu screens to include an application menu configured to display a predetermined number of application items among a plurality of application items and at least one of a first card object configured to display a scaled image of the video, a second card object that includes at least one link to tune to one or more channels of the broadcast signal or the network, or a third card object that includes at least one link for connecting to a content provider or to a storage device, wherein the first multifunctional menu screen is configured to be different than the second multifunctional menu screen; and displaying the first or second multifunctional menu screen in response to a login request to a corresponding user account, wherein the first multifunctional menu screen is associated with a first user account and the second multifunctional menu screen is associated with a second user account,

*wherein the application menu includes items designated as mandatory application items and optional application items as set by the user,*

*wherein the first multifunctional menu screen is a default menu screen, and*

*wherein the default menu screen includes a login icon for logging in to a different account, wherein logging into the different account changes the displayed multifunctional menu screen,*

*wherein mandatory application items in the default menu screen cannot be deleted by the user and mandatory application items in the second multifunctional menu screen that is associated with the second user account can be deleted by the user.*

2. The method of claim 1, wherein the configuring includes changing a layout of the first or second multifunctional menu screen.

3. The method of claim 2, wherein the changing the layout includes positioning the at least one card object in an area of the display or resizing the at least one card objects.

4. The method of claim 1, wherein the configuring includes changing a content of at least one of the card objects.

5. The method of claim 1, wherein the configuring the first or second multifunctional menu screen includes configuring based on parental control settings.

6. The method of claim 1, wherein the configuring includes selecting the at least one of the card objects from a plurality of types of card objects.

7. The method of claim 1, further comprises storing the configured multifunctional menu screen to correspond to the associated user account.

8. The method of claim 1, wherein the displaying the first multifunctional menu screen includes receiving a request to display a multifunctional menu screen;

creating the first user account;

displaying an edit mode that includes a default multifunctional menu screen based on default preference settings;

receiving inputs to edit a display configuration of the default multifunctional menu screen;

storing the edited configuration to correspond to the first user account; and displaying the edited multifunctional menu screen.

9. The method of claim 1, wherein the displaying the first or second multifunctional menus screen in response to the login request includes acquiring a first or second user authentication information corresponding to the respective user account.

10. The method of claim 9, wherein the user authentication information includes at least one of a user ID and password, a voice recognition information, or a facial recognition information.

11. The method of claim 1, wherein the displaying the first or second multifunctional menu screen in response to the login request includes displaying a plurality of icons corresponding to a plurality of user accounts, and receiving a selection of one of the plurality of icons.

12. The method of claim 1, wherein the login request is an input generated by a motion sensing remote controller.

13. The method of claim 1, wherein the login request is generated in response to a selection of a prescribed button on a motion sensing remote controller or a selection of an icon displayed on the display using a cursor controlled by a motion sensing remote controller.

[14. The method of claim 1, wherein the first multifunctional menu screen is a default menu screen.]

[15. The method of claim 14, wherein the default menu screen includes a login icon for logging in to a different account, wherein logging into the different account changes the displayed multifunctional menu screen.]

16. The method of claim 1, wherein the configuring the first and second multifunctional menu screens includes configuring the first and second multifunctional menu screens based on one of a plurality of predefined configurations.

17. The method of claim 1, wherein the configuring the first and second multifunctional menu screens includes selecting at least one category of content for display.

18. The method of claim 17, wherein the at least one category is provided by the content provider over the network.

[19. A method of controlling a display on a multifunctional display device, comprising:

displaying a video on the display received through a channel of a broadcast signal tuned by a tuner or over a network;

receiving a request to display a menu screen to access content available on the multifunctional display device, wherein the menu screen includes an application menu configured to display a predetermined number of application items among a plurality of application items and at least one of a first card object configured to display a scaled image of the video, a second card object that includes at least one link to tune to one or more channels of the broadcast signal or the network, or a third card object that includes at least one link for connecting to a content provider or to a storage device;

displaying a login screen to receive authentication information for a user account;

authenticating the user based on the authentication information;

determining whether the user account includes a customized menu screen, and creating the customized menu screen if the user account does not include the customized menu screen; and displaying the customized menu screen associated with the user account.]

[20. A multifunctional display apparatus, comprising:

a tuner configured to tune to a channel of a broadcast signal;

a network interface configured to receive data packets;

a display module;

a wireless input interface to receive signals from a remote controller;

a storage device to store display screen image configurations; and a processor configured to control the display module based on a signal from the remote controller, wherein a video received through the channel of the broadcast signal tuned by the tuner or over the network is displayed on the display module, a first multifunctional menu screen is displayed on the display module, wherein the first multifunctional menu screens includes an application menu configured to display a predetermined number of application items among a plurality of application items and at least one of a first card object displayed in a first area of the display module configured to display a scaled image of the video, a second card object displayed in a second area of the display module that includes at least one link to tune to a channel of a broadcast signal or a network, or a third card object that includes at least one link for connecting to a content provider or to a storage device, a configuration of at least one of a layout or content of the card objects in the first multifunctional menu screen is changed and the changed configuration is stored to correspond to a user account stored on the multifunctional display apparatus.]

* * * * *